(12) United States Patent
Tanaka et al.

(10) Patent No.: US 7,299,695 B2
(45) Date of Patent: Nov. 27, 2007

(54) ACCELERATION SENSOR

(75) Inventors: Hiroshi Tanaka, Yokohama (JP);
Masanori Yachi, Yokohama (JP);
Takashi Kato, Sannohe (JP); Hiroshi Ishikawa, Kawasaki (JP)

(73) Assignee: Fujitsu Media Devices Limited, Yokohama (JP)

( * ) Notice: Subject to any disclaimer, the term of this patent is extended or adjusted under 35 U.S.C. 154(b) by 0 days.

(21) Appl. No.: 10/924,261

(22) Filed: Aug. 24, 2004

(65) Prior Publication Data
US 2005/0066725 A1    Mar. 31, 2005

Related U.S. Application Data

(63) Continuation of application No. PCT/JP03/01164, filed on Feb. 5, 2003.

(30) Foreign Application Priority Data
Feb. 25, 2002    (JP)    ............... 2002-048677

(51) Int. Cl.
*G01P 15/09*    (2006.01)
(52) U.S. Cl. ............. 73/510; 73/514.02; 73/514.34; 310/329
(58) Field of Classification Search ......... 73/514.34, 73/514.2, 493, 510, 514.02; 310/329
See application file for complete search history.

(56) References Cited

U.S. PATENT DOCUMENTS 4,700,973 A * 10/1987 Gademann et al. ......... 73/493
4,996,878 A * 3/1991 Kubler ................... 73/514.34
5,824,904 A   10/1998 Kouhei et al. ........... 73/514.34
6,021,671 A    2/2000 Kami et al. .............. 73/514.34
6,513,382 B2 * 2/2003 Tanaka et al. ............ 73/514.34
6,668,649 B2 * 12/2003 Ishitoko et al. .......... 73/504.12
2001/0049961 A1 12/2001 Tanaka et al. ............ 73/514.34

FOREIGN PATENT DOCUMENTS

| EP | 1 113 272 A2 | 7/2001 |
|----|--------------|--------|
| JP | 5-133973     | 5/1993 |
| JP | 6-273439     | 9/1994 |
| JP | 7-140164     | 6/1995 |
| JP | 7-209071     | 8/1995 |
| JP | 8-136573     | 5/1996 |
| JP | 2000-171480  | 6/2000 |
| JP | 2001-349900  | 12/2001 |

* cited by examiner

Primary Examiner—John E. Chapman
(74) Attorney, Agent, or Firm—Arent Fox, LLP

(57) ABSTRACT

An acceleration sensor includes a weight and a vibrator that supports the weight at its center of gravity. When acceleration is applied to the weight, stress equivalent to the applied acceleration is generated in the vibrator. As the vibrator is arranged to support the weight at its center of gravity, a characteristic relationship is observed between the acceleration, such as angular acceleration or translational acceleration, and the size of electric charges and the polarity. By taking advantage of this relationship, different types of acceleration can be easily detected.

12 Claims, 22 Drawing Sheets

CUT ANGLE θ (deg)

IN-PLANE ANGULAR ACCELERATION:POSITIONED AT CENTER OF ROTATION

IN-PLANE ANGULAR ACCELERATION:POSITIONED OUT OF CENTER OF ROTATION

Fig. 7A (CIRCUIT A: DIFFERENTIAL CIRCUIT)
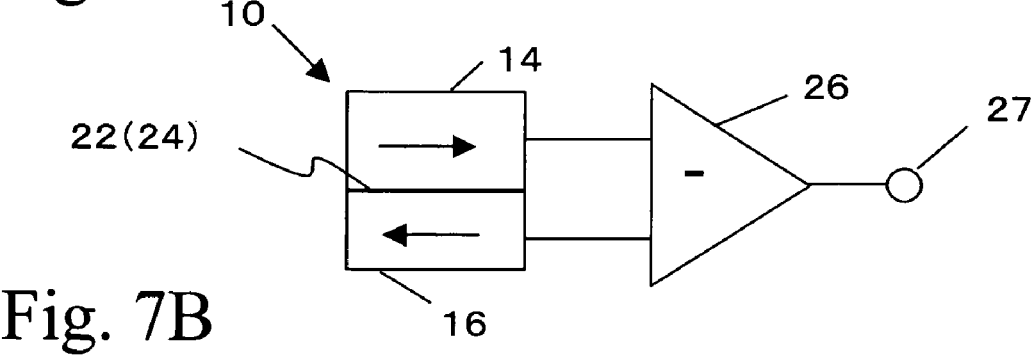
Fig. 7B (CIRCUIT B: ADDER CIRCUIT)
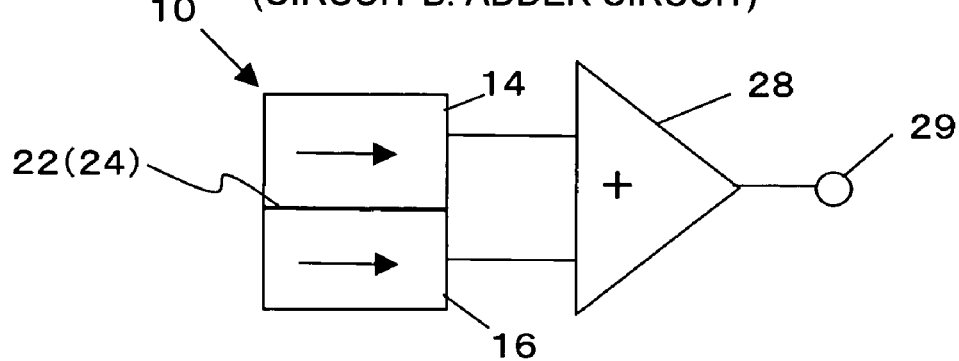
Fig. 7C (CIRCUIT C: CIRCUIT A + CIRCUIT B)
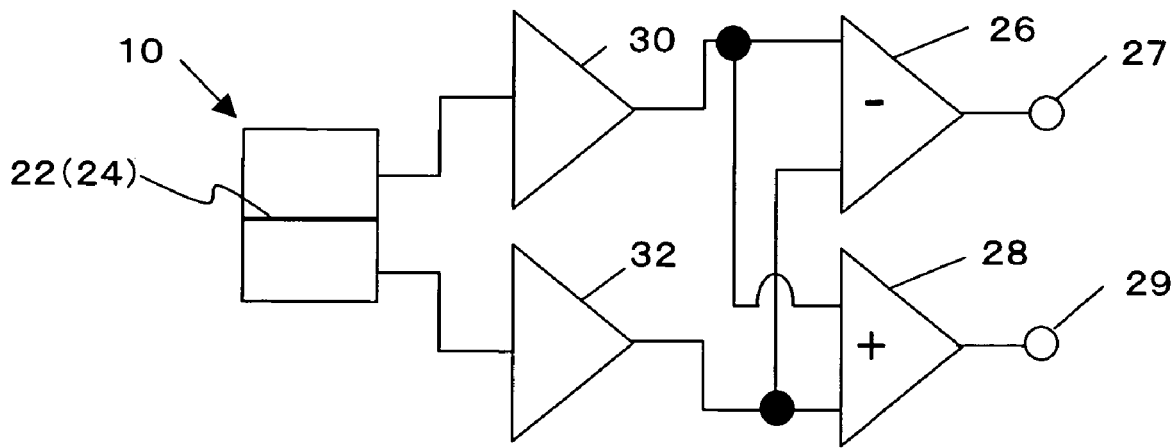

Fig. 8A

SENSOR IS POSITIONED AT CENTER OF ROTATION

|  | ANGULAR ACCELERATION | | TRANSLATIONAL ACCELERATION | | |
| --- | --- | --- | --- | --- | --- |
|  | IN-PLANE: ABOUT X AXIS (CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECT |
| CIRCUIT B | UNDETECT | UNDETECT | DETECT | UNDETECT | UNDETECT |
| CIRCUIT C | DETECT | UNDETECT | DETECT | UNDETECT | UNDETECT |

Fig. 8B

SENSOR IS POSITIONED OUT OF CENTER OF ROTATION

|  | ANGULAR ACCELERATION | | TRANSLATIONAL ACCELERATION | | |
| --- | --- | --- | --- | --- | --- |
|  | IN-PLANE: ABOUT X AXIS (OUT OF CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECT |
| CIRCUIT B | DETECT | UNDETECT | DETECT | UNDETECT | UNDETECT |
| CIRCUIT C | DETECT | UNDETECT | DETECT | UNDETECT | UNDETECT |

IN-PLANE ANGULAR ACCELERATION:POSITIONED AT CENTER OF ROTATION

IN-PLANE ANGULAR ACCELERATION:POSITIONED OUT OF CENTER OF ROTATION

Fig. 12A

SENSOR IS POSITIONED AT CENTER OF ROTATION

|  | ANGULAR ACCELERATION | | TRANSLATIONAL ACCELERATION | | |
| --- | --- | --- | --- | --- | --- |
|  | IN-PLANE: ABOUT X AXIS (CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECT |
| CIRCUIT B | UNDETECT | UNDETECT | UNDETECT | UNDETECT | DETECT |
| CIRCUIT C | DETECT | UNDETECT | UNDETECT | UNDETECT | DETECT |

Fig. 12B

SENSOR IS POSITIONED OUT OF CENTER OF ROTATION

|  | ANGULAR ACCELERATION | | TRANSLATIONAL ACCELERATION | | |
| --- | --- | --- | --- | --- | --- |
|  | IN-PLANE: ABOUT X AXIS (OUT OF CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECTED |
| CIRCUIT B | DETECT | UNDETECT | UNDETECT | UNDETECT | DETECTED |
| CIRCUIT C | DETECT | UNDETECT | UNDETECT | UNDETECT | DETECTED |

θ =31°

IN-PLANE ANGULAR ACCELERATION:POSITIONED AT CENTER OF ROTATION

IN-PLANE ANGULAR ACCELERATION:POSITIONED OUT OF CENTER OF ROTATION

Fig. 17A

SENSOR IS POSITIONED AT CENTER OF ROTATION

|  | ANGULAR ACCELERATION | | TRANSLATIONAL ACCELERATION | | |
| --- | --- | --- | --- | --- | --- |
|  | IN-PLANE: ABOUT X AXIS (CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECT |
| CIRCUIT B | UNDETECT | UNDETECT | DETECT | UNDETECT | UNDETECT |
| CIRCUIT C | DETECT | UNDETECT | DETECT | UNDETECT | UNDETECT |

Fig. 17B

SENSOR IS POSITIONED OUT OF CENTER OF ROTATION

|  | ANGULAR ACCELERATION | | TRANSLATIONAL ACCELERATION | | |
| --- | --- | --- | --- | --- | --- |
|  | IN-PLANE: ABOUT X AXIS (OUT OF CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECT |
| CIRCUIT B | DETECT | UNDETECT | DETECT | UNDETECT | UNDETECT |
| CIRCUIT C | DETECT | UNDETECT | DETECT | UNDETECT | UNDETECT |

θ = 121°

IN-PLANE ANGULAR ACCELERATION:POSITIONED AT CENTER OF ROTATION

IN-PLANE ANGULAR ACCELERATION:POSITIONED OUT OF CENTER OF ROTATION

IN-PLANE ANGULAR ACCELERATION

Z-AXIS TRANSLATIONAL ACCELERATION

Y- OR X-AXIS TRANSLATIONAL ACCELERATION

Fig. 22A

SENSOR IS POSITIONED AT CENTER OF ROTATION

|  | ANGULAR ACCELERATION | | TRANSLATIONAL ACCELERATION | | |
|---|---|---|---|---|---|
|  | IN-PLANE: ABOUT X AXIS (CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECT |
| CIRCUIT B | UNDETECT | UNDETECT | DETECT | UNDETECT | UNDETECT |
| CIRCUIT C | DETECT | UNDETECT | DETECT | UNDETECT | UNDETECT |

Fig. 22B

SENSOR IS POSITIONED OUT OF CENTER OF ROTATION

|  | ANGULAR ACCELERATION | | TRANSLATIONAL ACCELERATION | | |
|---|---|---|---|---|---|
|  | IN-PLANE: ABOUT X AXIS (OUT OF CENTER OF ROTATION) | VERTICAL TO PLANE: ABOUT Z, Y AXES | Z AXIS | X-AXIS | Y-AXIS |
| CIRCUIT A | DETECT | UNDETECT | UNDETECT | UNDETECT | UNDETECT |
| CIRCUIT B | DETECT | UNDETECT | DETECT | UNDETECT | UNDETECT |
| CIRCUIT C | DETECT | UNDETECT | DETECT | UNDETECT | UNDETECT |

ACCELERATION SENSOR

This nonprovisional application is a continuation application of and claims the benefit of International Application No. PCT/JP03/01164, filed Feb. 5, 2003. The disclosure of the prior application is hereby incorporated herein in its entirety by reference.

FIELD OF THE INVENTION

The present invention relates to piezoelectric acceleration sensors that are used to detect impact and acceleration applied to objects, and more particularly, to an acceleration sensor that detects a feature quantity generated by inertial force caused by acceleration.

In recent years, the recording density of each hard disk drive (HDD) has rapidly become higher, and accordingly, there is an increasing demand for a precise control technique to accurately position the head that performs read/write operations. For example, when the housing of an HDD rotationally vibrates due to external vibration caused by another electronic device (such as a DVD or a CD-ROM) in a personal computer, the rotational vibration needs to be detected before a necessary operation is performed to maintain accurate positioning control. To detect the rotational vibration, two acceleration sensors are used. The rotational vibration is detected from the output differences between the two acceleration sensors.

As the devices having acceleration sensors mounted thereon are becoming smaller in size with higher performance, acceleration sensors are also required to become smaller in size and to have a higher performance.

BACKGROUND OF THE INVENTION

Japanese Laid-Open Patent Application Publication No. 6-273439 discloses a piezoelectric acceleration sensor that detects acceleration from the bend of piezoelectric ceramics. Japanese Laid-Open Patent Application Publication No. 7-140164 discloses a piezoelectric acceleration sensor that simultaneously detects translational acceleration and angular acceleration from the bends of two piezoelectric single-crystal substrates. Japanese Laid-Open Patent Application Publication No. 2000-171480 discloses a piezoelectric acceleration sensor that detects translational acceleration and angular acceleration separately, based on the bends of piezoelectric single-crystal materials and the sign difference between the outputs of the piezoelectric single-crystal materials.

Since two acceleration sensors are used in the conventional technique using piezoelectric ceramics, the low mounting accuracy of the two sensors on a substrate as well as the difference in sensitivity between the two sensors results in poor positioning control. With the acceleration sensor using two piezoelectric single-crystal substrates, there are problems in that a decrease in size is difficult to achieve and angular acceleration and translational acceleration cannot be detected separately from each other. With the acceleration sensor that detects acceleration from the bends of two piezoelectric single-crystal substrates and the sign difference between the two outputs, there are problems in that the production process is complicated and it is difficult to reduce the production cost, because the two piezoelectric substrates are bonded to each other and are then bonded to a supporting substrate.

The object of the present invention is to provide a sensor with a simple structure that eliminates the above problems and can easily detect different types of acceleration, such as angular acceleration and translational acceleration.

DISCLOSURE OF THE INVENTION

To achieve the above object, the present invention provides an acceleration sensor that includes a weight and a vibrator that supports the weight at its center of gravity. When acceleration is applied to the weight, stress equivalent to the applied acceleration is generated in the vibrator. As the vibrator is arranged to support the weight at its center of gravity, a characteristic relationship is observed between the acceleration, such as angular acceleration or translational acceleration, and the size of electric charges and the polarity. By taking advantage of this relationship, different types of acceleration can be easily detected.

BRIEF DESCRIPTION OF THE DRAWINGS

FIGS. 7A through 7C each shows an example structure of a detection circuit that can be employed in each embodiment of the present invention;

FIG. 8A shows the relationship between each detection circuit and detected acceleration in the case where the center point of the acceleration sensor is located at the center of rotation in the first embodiment;

FIG. 8B shows the relationship between each detection circuit and detected acceleration in the case where the center point of the acceleration sensor is not located at the center of rotation in the first embodiment;

FIG. 12A shows the relationship between each detection circuit and detected acceleration in the case where the center point of the acceleration sensor is located at the center of rotation in the second embodiment;

FIG. 12B shows the relationship between each detection circuit and detected acceleration in the case where the center point of the acceleration sensor is not located at the center of rotation in the second embodiment;

FIG. 17A shows the relationship between each detection circuit and detected acceleration in the case where the center point of the acceleration sensor is located at the center of rotation in the third embodiment;

FIG. 17B shows the relationship between each detection circuit and detected acceleration in the case where the center point of the acceleration sensor is not located at the center of rotation in the third embodiment;

FIG. 22A shows the relationship between each detection circuit and detected acceleration in the case where the center point of the acceleration sensor is located at the center of rotation in the fourth embodiment;

FIG. 22B shows the relationship between each detection circuit and detected acceleration in the case where the center point of the acceleration sensor is not located at the center of rotation in the fourth embodiment;

BEST MODES FOR CARRYING OUT THE INVENTION

FIRST EMBODIMENT

Figure 1A:
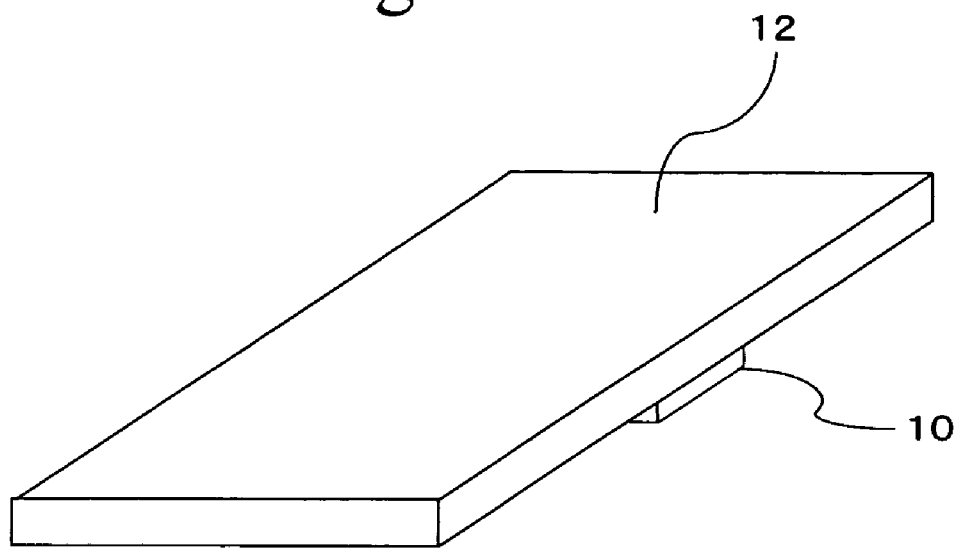
FIG. 1A is a perspective view of an acceleration sensor in accordance with a first embodiment of the present invention.
Figure 1B:
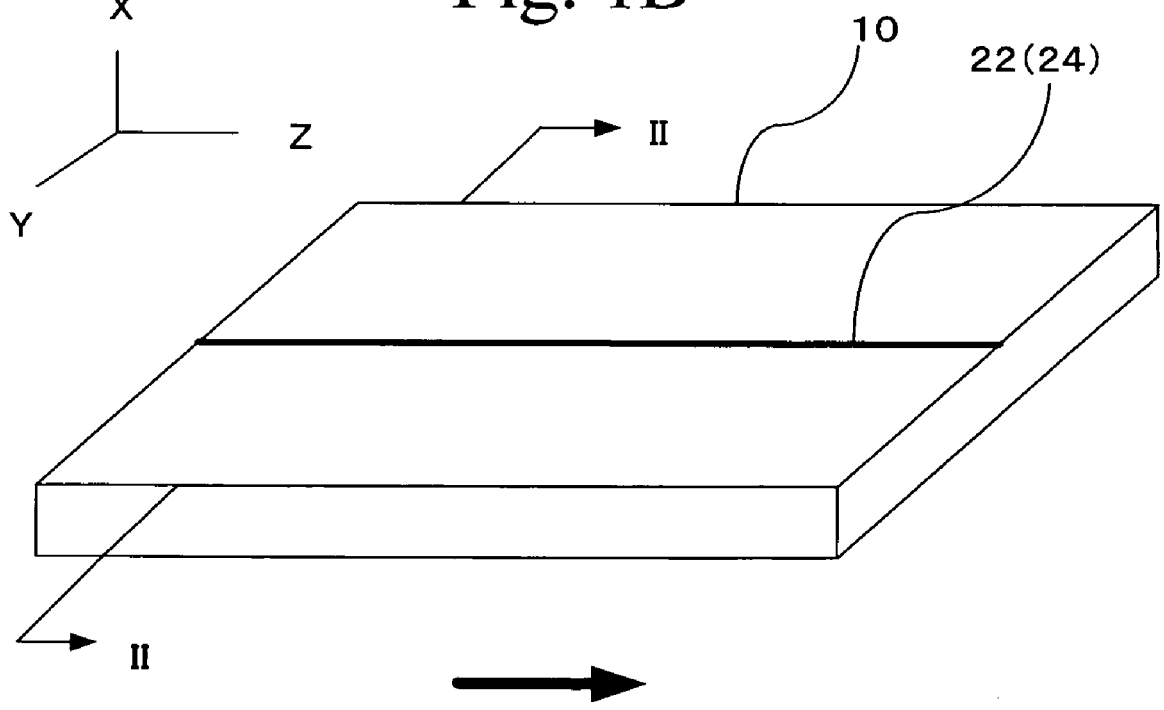
FIG. 1B is a perspective view of the vibrator of the acceleration sensor in accordance with the first embodiment.

FIGS. 1A and 1B illustrate a first embodiment of the present invention. FIG. 1A is a perspective view illustrating the structure of an acceleration sensor of the first embodiment. This acceleration sensor includes a vibrator 10 and a weight 12. In FIG. 1A, the thickness direction of the weight 12 is defined as X axis, the longitudinal direction of the weight 12 is Y axis, and the width direction of the weight 12 is Z axis. With respect to the vibrator 10, the thickness direction is defined as the X axis, the longitudinal (or width) direction is the Y axis, and the width (or longitudinal) direction is the Z axis.

The weight 12 is formed with a rectangular plate-like material. The weight 12 is made of a metal with a relatively high density, or an insulating material such as alumina or flint glass. The weight 12 may be made of a single material, or two or more different materials. In the latter case, the weight 12 has a laminated structure of two or more different materials.

The vibrator 10 is located at the center of gravity of the weight 12. If the weight 12 has a uniform density, its center of gravity is also the center of the weight 12. The vibrator 10 is positioned so that the center of the vibrator 10 is matched with the center of the weight 12. Also, the center line of the vibrator 10 is matched with the center line of the weight 12 in the longitudinal direction (i.e., the line dividing the weight 12 into two in the Y-axis direction). From the viewpoint of the vibrator 10, the vibrator 10 supports the weight 12 at the center of gravity of the weight 12. The vibrator 10 is made of piezoelectric ceramics. As shown in FIG. 1B, the vibrator 10 is polarized in the Z-axis direction. In this embodiment, the cut angle θ of the piezoelectric ceramics crystal plate in the Z-axis direction is zero degrees (θ=0°). For example, the vibrator 10 may be made of PZT-based piezoelectric ceramics with a relatively high electromechanical coupling coefficient. The polarization of piezoelectric ceramics is carried out by applying a high voltage to the area between the two end faces of the piezoelectric ceramics crystal plate. In the example shown in FIG. 1A, the length of the weight 12 in the Z-axis direction is substantially the same as the length of the vibrator 10 in the Z-axis direction. However, the length of the weight 12 in the Z-axis direction may be different from the length of the vibrator 10 in the Z-axis direction. For example, the vibrator 10 may be shorter than the weight 12 in the Z-axis direction. The cut angle (θ=0°) of this embodiment will be described later in detail.

Figure 2A:
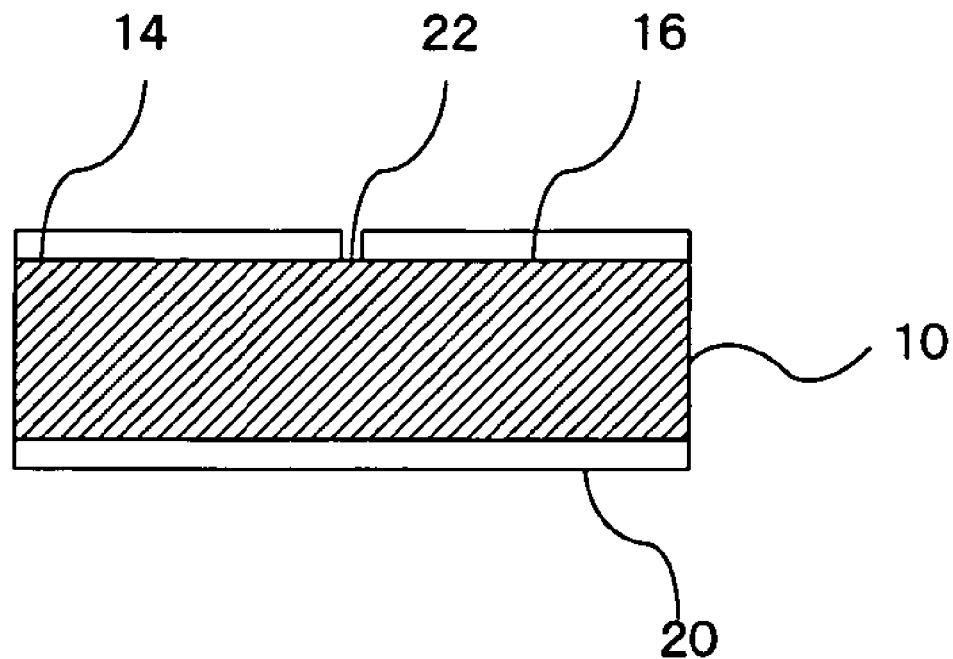
FIG. 2A is a sectional view of an example the vibrator, taken along the line II-II of FIG. 1B.
Figure 2B:
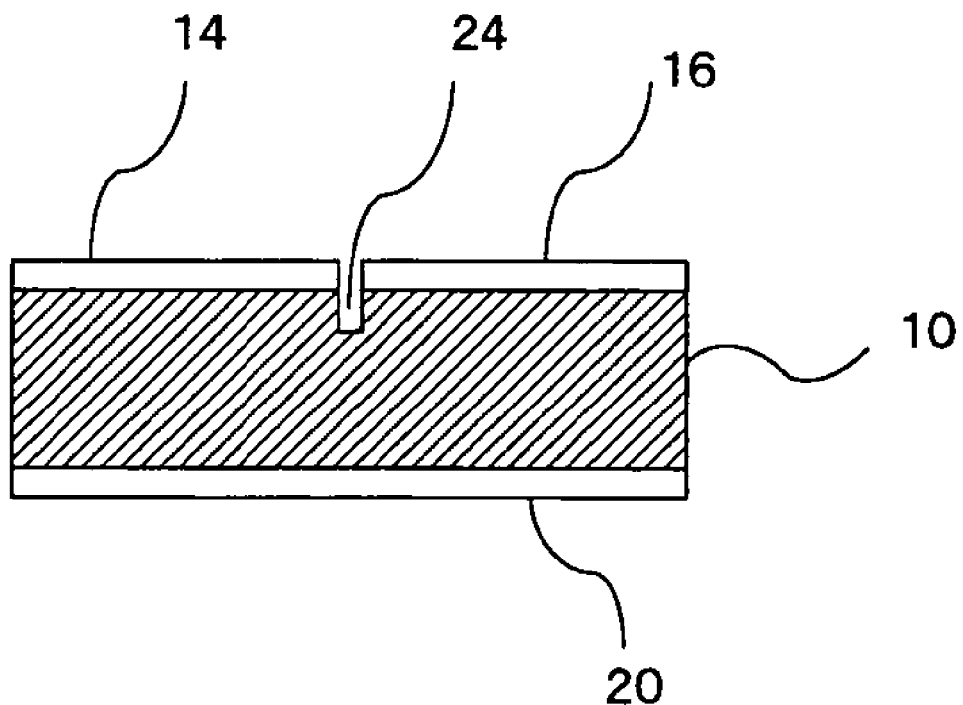
FIG. 2B is a sectional view of another example of the vibrator, taken along the line II-II of FIG. 1B.

The vibrator 10 is a shear vibrator that is divided into two in the Y-axis direction. Examples of the vibrator 10 divided into two in the Y-axis direction are shown in FIGS. 2A and 2B. FIGS. 2A and 2B are vertical sectional views of the vibrator 10, taken along the line II-II of FIG. 1B. As shown in FIG. 2A, the vibrator 10 in the form of a rectangular parallelepiped has electrodes 14 and 16 formed on a surface. The electrodes 14 and 16 are arranged on the surface of the vibrator 10 in such a manner as to divide the surface into two equal parts in the Y-axis direction. The electrodes 14 and 16 are the same in size, and are located next to each other in the Y-axis direction, with a separation groove 22 being interposed between the electrodes 14 and 16. The separation groove 22 runs in the Z-axis direction. The electrodes 14 and 16 serve as detection electrodes. An electrode 20 is formed on the opposite surface of the vibrator 10 from the electrodes 14 and 16. The electrode 20 serves as a ground electrode. A voltage is generated between the detection electrode 14 and the ground electrode 20, and between the detection electrode 16 and the ground electrode 20. The amount of voltage generated here varies depending on the acceleration. In the structure shown in FIG. 2A, the two detection electrodes 14 and 16 divide the vibrator 10 into two in the Y-axis direction. In terms of polarization, the vibrator 10 is divided into two in the direction parallel to the polarization direction. As for the relation with the weight 12, the vibrator 10 is divided into two in the longitudinal direction of the weight 12.

In the vibrator 10 shown in FIG. 2B, a separation groove 24 is further formed under the groove formed between the detection electrodes 14 and 16. The separation groove 24 extends in the Z-axis direction, and serves to increase sensitivity to acceleration. The sensitivity varies with the width or the depth of the separation groove 24.

Each of the detection electrodes 14 and 16 has a multi-layer structure of different metals. For example, each of the detection electrodes 14 and 16 may be a double-layer electrode, having a base layer of Ni or NiCr and an Au layer formed on the base layer. These electrode layers may be formed by a known technique, such as sputtering, sintering, vapor deposition, electroplating, or electroless plating. After the formation of the electrode layers, patterning is performed on the electrode layers by etching or laser trimming so as to form the detection electrodes 14 and 16. At this point, the separation groove 22 described above is also formed. The ceramics crystal plate is then cut into ceramics crystal pieces to serve as vibrators 10 by dicing.

The vibrator 10 is attached to the position corresponding to the center of gravity of the weight 12 with an epoxy resin adhesive, for example. Here, the detection electrode 14 and 16 is brought into contact with the weight 12, or the ground electrode 20 is brought into contact with the weight 12. The extraction electrode for the detection electrodes 14 and 16 or the ground electrode 20 can be formed by a known technique. If the weight 12 is made of an insulating material, for example, a conductive pattern is formed on the surface of the weight 12, and the detection electrodes 14 and 16 or the ground electrode 20 is connected to the conductive pattern. In this case, an anisotropic conductive adhesive is used. If the weight 12 is made of a metal, the ground electrode 20 is attached to the weight 12 with an isotropic conducive adhesive. Alternatively, a flexible printed wiring board may be employed. In a case where the vibrator 10 is arranged so that the detection electrodes 14 and 16 face the weight 12, for example, a wiring board having a suitable wiring pattern is interposed between the vibrator 10 and the weight 12, and is connected to the vibrator 10 and the weight 12 with an anisotropic conductive adhesive.

Despite its simple structure, the acceleration sensor of the first embodiment is capable of detecting both angular acceleration (rotational acceleration) and translational acceleration with a single sensor.

Figure 3:
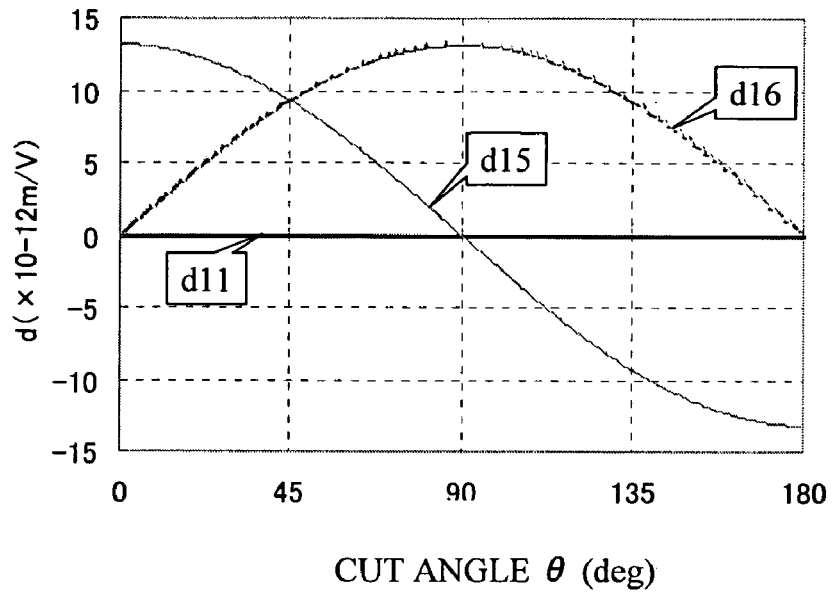
FIG. 3 shows examples of the constants of piezoelectric ceramics.
Figure 4A:
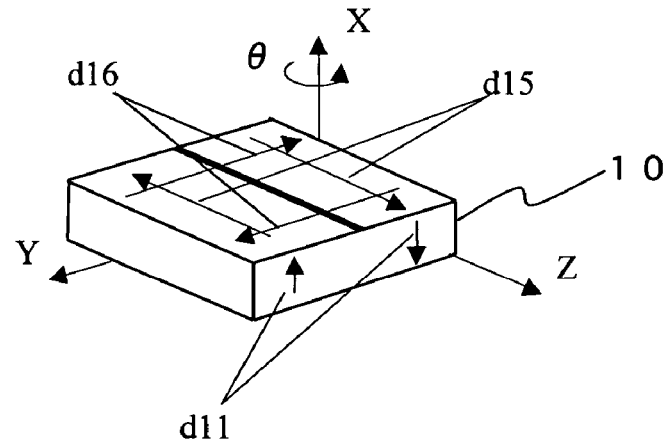
FIG. 4A illustrates the constants obtained with the structure shown in FIG. 2A.
Figure 4B:
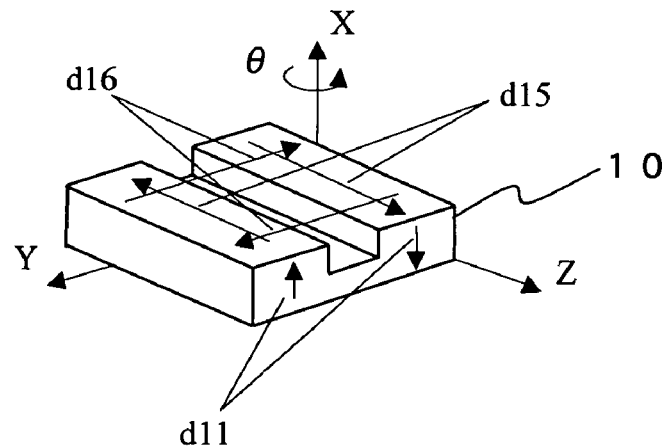
FIG. 4B illustrates the constants obtained with the structure shown in FIG. 2B.

Examples of the piezoelectric constants of piezoelectric ceramics are shown in FIGS. 3, 4A, and 4B. In FIGS. 3, 4A, and 4B, the piezoelectric constants are denoted by d11, d15, and d16. The vibrator shown in FIG. 4A is equivalent to the vibrator 10 with the structure shown in FIG. 2A. The vibrator shown in FIG. 4B is equivalent to the vibrator 10 with the structure shown in FIG. 2B.

In the first embodiment of the present invention, the cut angle θ of the piezoelectric ceramics is set at zero degrees (θ=0°). When the cut angle θ is zero degrees (θ=0°), the constant d16 in the Y-axis direction, which is the longitudinal direction of the weight 12, is zero. At the same time, the constant d11 in the X-axis direction, which is the thickness direction of the weight 12, is zero. By setting the cut angle θ at zero degrees (θ=0°), an acceleration sensor with the characteristics described below can be realized.

Figure 5A:
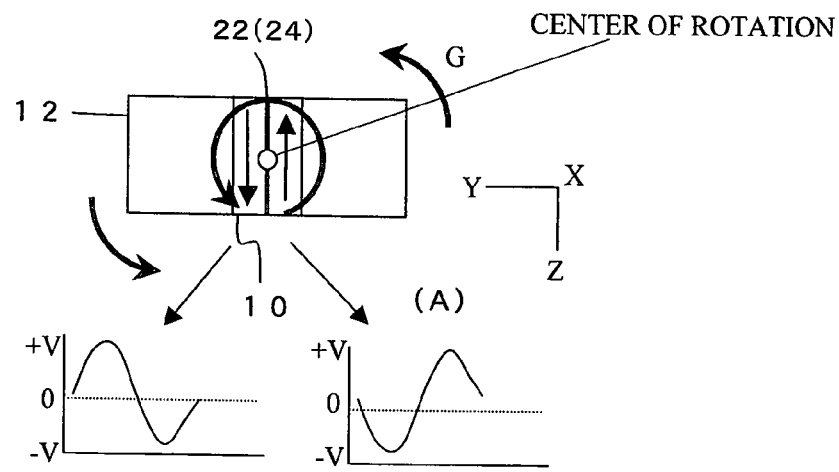
FIGS. 5A and 5B illustrate the principles of acceleration detection in accordance with the first embodiment of the present invention.

When an in-plane rotational vibration is applied to the acceleration sensor, and the center point of the acceleration sensor is located at the center of rotation, stress is caused in the vibrator 10 with the two-section structure, as indicated by arrows in FIG. 5A. As a result, potentials (electric charges) that have the same amplitude values and are in the opposite phases are generated in the vibrator 10 (in the two divided sections of the vibrator 10, more specifically).

Figure 5B:
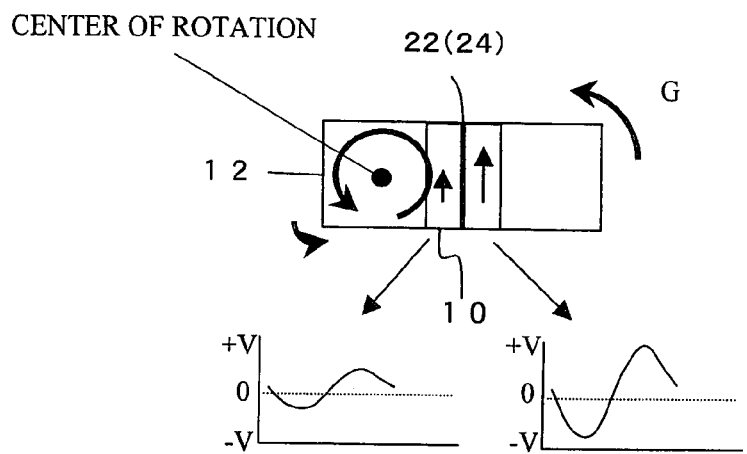

When an in-plane rotational vibration is applied to the acceleration sensor, and the center point of the acceleration sensor is located in a different position from the center of rotation, stress is caused in the vibrator 10 with the two-section structure, as indicated by arrows in FIG. 5B. As a result, potentials that have different amplitude values and are in the same phase are generated in the vibrator 10.

Figure 6A:
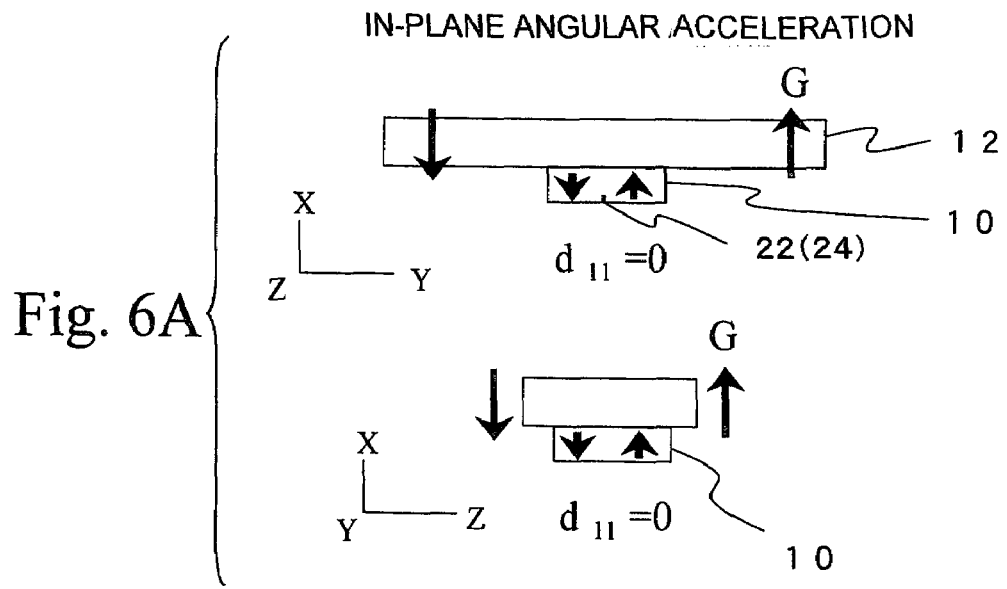
FIGS. 6A through 6C also illustrate the principles of acceleration detection in accordance with the first embodiment of the present invention.

When a rotational vibration in the direction perpendicular to the plane is applied to the acceleration sensor, the piezoelectric constant d11 in the thickness direction of the vibrator 10 (X-axis direction) is zero (see FIG. 3), and potentials are not generated in the vibrator 10 with the two-section structure, as shown in FIG. 6A.

Figure 6B:
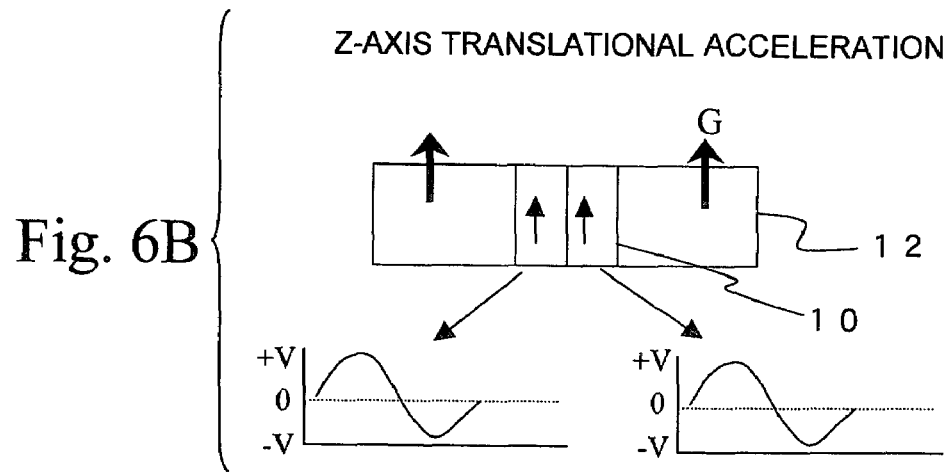

When a translational acceleration in the Z-axis direction is applied, stress is caused in the vibrator 10 with the two-section structure, as indicated by arrows in FIG. 6B, and potentials that have the same amplitude values and are in the same phase are generated in the vibrator 10.

Figure 6C:
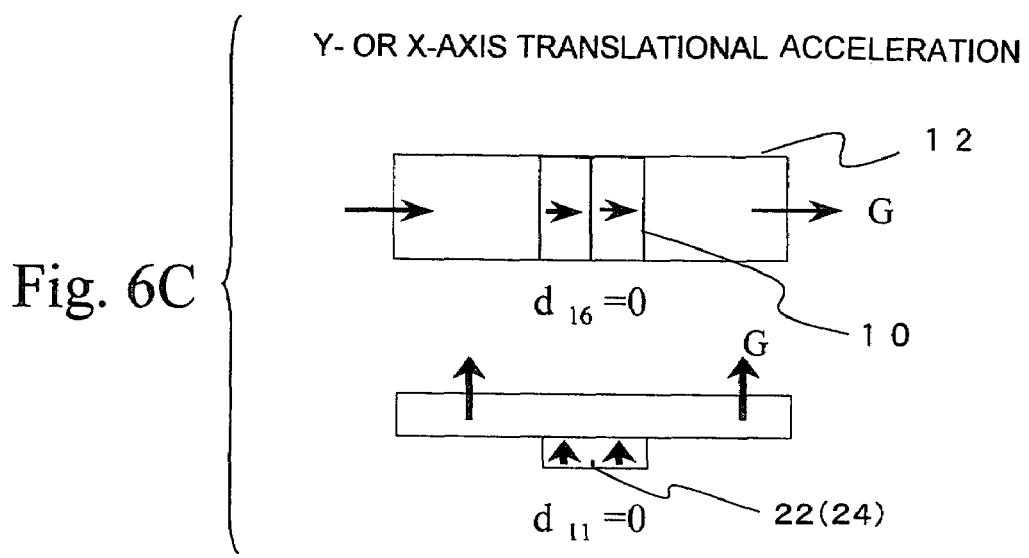

When a translational acceleration in the X-axis or Y-axis direction is applied, the constant d16 that is perpendicular to the polarization axis and the constant d11 in the thickness direction are both zero (see FIG. 3), and potentials are not generated in the vibrator 10 with the two-section structure, as shown in FIG. 6C.

The acceleration sensor described above is to be connected to detection circuits (hereinafter referred to as the circuit A, the circuit B, and the circuit C) shown in FIGS. 7A, 7B, and 7C. The circuit A shown in FIG. 7A has a differential circuit (a subtraction circuit) 26 to differentially detect the two potentials generated in the vibrator 10. A differential output signal is then outputted via an output terminal 27. The circuit B shown in FIG. 7B has an addition circuit 28 to detect and adds the two potentials generated in the vibrator 10. An addition output signal is then outputted via an output terminal 29. The circuit C shown in FIG. 7C is a combination of the circuit A and the circuit B. Reference numerals 30 and 32 indicate amplifiers. These amplifiers may be placed in a stage later than the differential circuit 26 and the addition circuit 28.

Next, acceleration detection performed in the case where the center point of the acceleration sensor of the first embodiment is located at the center of rotation as shown in FIG. 5A is described. FIG. 8A shows the relationship between detectable accelerations and each of the circuits A, B, and C. In the case where the circuit A is employed, the in-plane angular acceleration (about the X axis) can be detected, as the two potentials are in the opposite phases with respect to the in-plane angular acceleration. With respect to the translational acceleration in the Z-axis direction, the two potentials have the same amplitude values and are in the same phase. Accordingly, the potentials are canceled by differential detection and become zero. As for the translational acceleration in the X-axis or Y-axis direction, the constants d are zero. In the case where the circuit B is employed, the two electric charges (or potentials) have the same amplitude values and are in the opposite phases with respect to the in-plane angular acceleration (about the X axis). Accordingly, the potentials are canceled by addition detection and become zero. With respect to the translational acceleration in the Z-axis direction, the two potentials have the same amplitude values and are in the same phase. Accordingly, the translational acceleration in the Z-axis direction can be detected by addition detection. As for the translational acceleration in the X-axis or Y-axis direction, the constants d are zero. The circuit C is a structure that processes outputs generated from the two regions on a surface of the vibrator 10 divided in the longitudinal direction of the weight 12, so as to output detection signals corresponding to angular acceleration and translational acceleration. With the circuit C, both the in-plane angular acceleration (about the X axis) and the translational acceleration in the Z-axis direction can be detected separately from each other. As described so far, when the center point of the acceleration sensor is located at the center of rotation, only the in-plane angular acceleration is detected with the circuit A, only the translational acceleration in the Z-axis direction is detected with the circuit B, and the angular acceleration (about the X axis) and the translational acceleration in the Z-axis direction are detected at the same time but separately from each other with the circuit C.

Next, acceleration detection performed when the center point of the acceleration sensor of the first embodiment is located in a different position from the center of rotation as shown in FIG. 5B is described. FIG. 8B shows the relationship between detectable accelerations and each of the circuits A, B, and C. In the case where the circuit A is employed, the in-plane angular acceleration (about the X axis) can be detected, as the two potentials exhibit different amplitude values and are in the same phase with respect to the in-plane angular acceleration. With respect to the translational acceleration in the Z-axis direction, the two potentials have the same amplitude values and are in the same phase. Accordingly, the potentials are canceled by differential detection and become zero. As for the translational acceleration in the X-axis or Y-axis direction, the constants d are zero. In the case where the circuit B is employed, the in-plane angular acceleration (about the X axis) can be detected by addition detection, as the two potentials have different amplitude values and are in the same phase with respect to the in-plane angular acceleration. The translational acceleration in the Z-axis direction can also be detected by addition detection, as the two potentials have the same amplitude values and are in the same phase with respect to the translational acceleration in the Z-axis direction. As for the translational acceleration in the X-axis or Y-axis direction, the constants d are zero. With the circuit C, the in-plane angular acceleration (about the X axis) and the translational acceleration in the Z-axis direction can be detected at the same time. As described so far, when the center point of the acceleration sensor is located in a different position from the center of rotation, only the in-plane angular acceleration is detected with the circuit A, and the in-plane angular acceleration and the translational acceleration in the Z-axis direction are detected at the same time with the circuit B or C.

As described so far, the acceleration sensor of the first embodiment can simultaneously detect angular acceleration and translational acceleration separately from each other.

In this embodiment, the two electric charges generated in the vibrator 10 divided by the two detection electrodes 14 and 16 (the electric charges generated on either side of the separation groove 22 or 24) are detected. However, the number of electrodes or the shape of the pattern can be arbitrarily changed, as long as the two charges can be detected. For example, one surface of the vibrator 10 may be divided into four, and each two neighboring electrodes in the polarization direction may be connected to each other to form two actual detection electrodes. With such a structure, the same functions and effects as the above can be achieved. This also applies to the other embodiments of the present invention described later.

Also, the cut angle θ is not strictly required to be zero degrees, and may include an error that is caused during the production process of the acceleration sensor. Furthermore, the cut angle θ may take any value in the neighborhood of 0°, as long as the effects shown in FIGS. 8A and 8B can be achieved, and the predetermined accuracy can be maintained in the acceleration detection.

SECOND EMBODIMENT

Figure 9A:
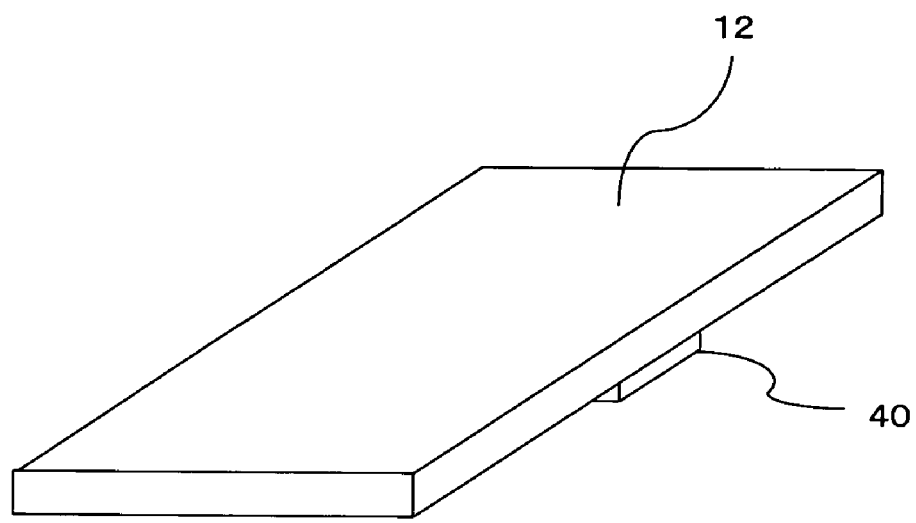
FIG. 9A is a perspective view of an acceleration sensor in accordance with a second embodiment of the present invention.
Figure 9B:
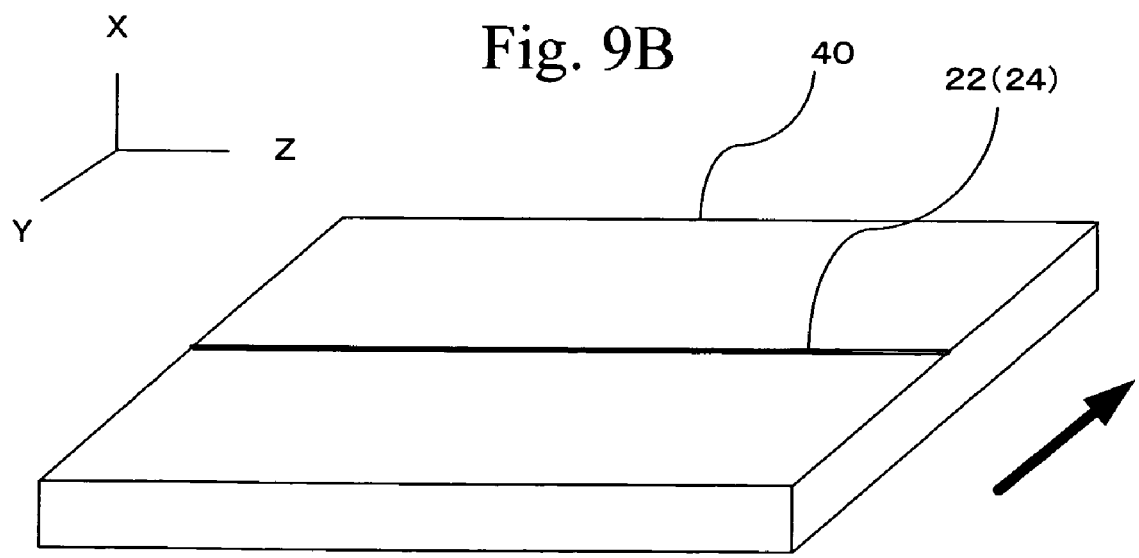
FIG. 9B is a perspective view of the vibrator of the acceleration sensor in accordance with the second embodiment.

FIGS. 9A and 9B illustrate an acceleration sensor in accordance with a second embodiment of the present invention. In FIGS. 9A and 9B, the same components as those described above are denoted by the same reference numerals as above. The X axis, the Y axis, and the Z axis are the same as those shown in FIG. 1A. A vibrator 40 of the second embodiment differs from the vibrator 10 in being polarized in the Y-axis direction as indicated by the arrow in FIG. 9B. In other words, the polarization direction of the vibrator 40 is equal to the longitudinal direction of the weight 12. The vibrator 40 is located at the center of gravity of the weight 12, and is divided into two as shown in FIG. 9B. The cut angle θ of the piezoelectric ceramics that forms the vibrator 40 is 90 degrees (θ=90°). As can be seen from FIG. 3, when the cut angle θ is 90°, the constant d15 in the direction perpendicular to the longitudinal direction of the weight 12 (i.e., the transverse direction of the weight 12) is zero.

By setting the cut angle θ of the piezoelectric ceramics at 90 degrees (θ=90°), an acceleration sensor with the characteristics described below can be realized.

Figure 10A:
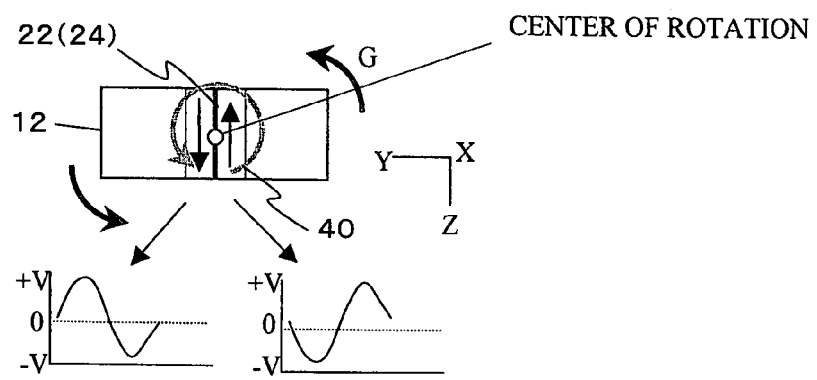
FIGS. 10A and 10B illustrate the principles of acceleration detection in accordance with the second embodiment of the present invention.

When an in-plane rotational vibration is applied to the acceleration sensor, and the center point of the acceleration sensor is located at the center of rotation, potentials that have the same amplitude values and are in the opposite phases are generated in the vibrator 40 with the two-section structure, as shown in FIG. 10A.

Figure 10B:
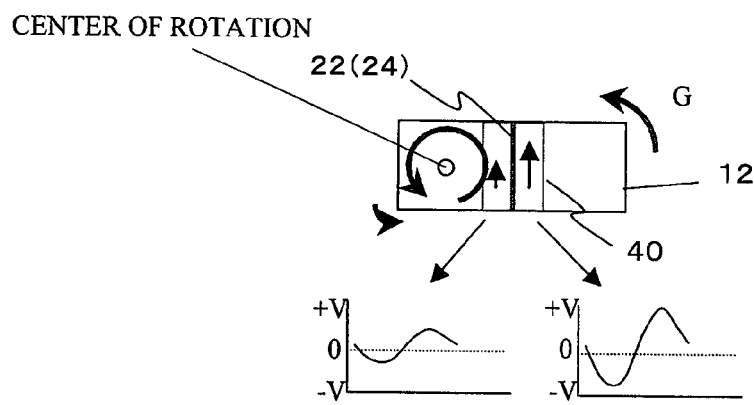

When an in-plane rotational vibration is applied to the acceleration sensor, and the center point of the acceleration sensor is located in a different position from the center of rotation, potentials that have different amplitude values and are in the same phase are generated in the vibrator 40, as shown in FIG. 10B.

Figure 11A:
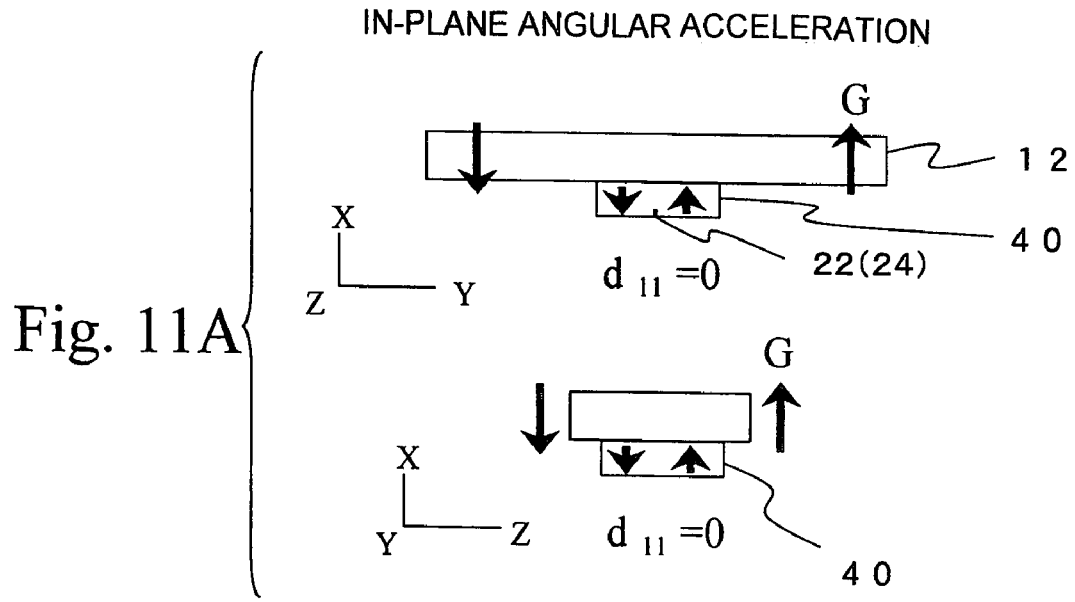
FIGS. 11A through 11C also illustrate the principles of acceleration detection in accordance with the second embodiment of the present invention.

When a rotational vibration in the direction perpendicular to the plane is applied to the acceleration sensor, the piezoelectric constant d11 in the thickness direction is zero, and potentials are not generated in the vibrator 40, as shown in FIG. 11A.

Figure 11B:
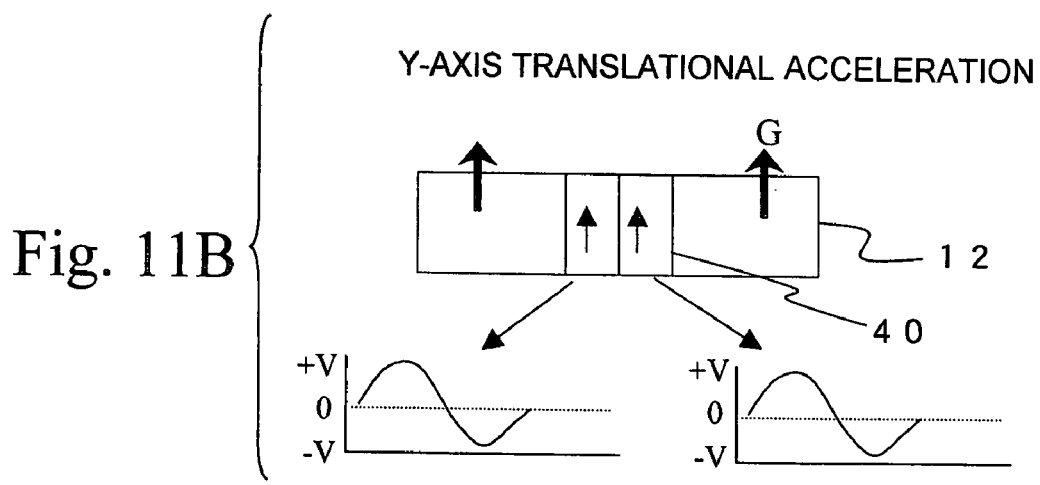

When a translational acceleration in the Y-axis direction is applied, potentials that have the same amplitude values and are in the same phase are generated in the vibrator 40, as shown in FIG. 11B.

Figure 11C:
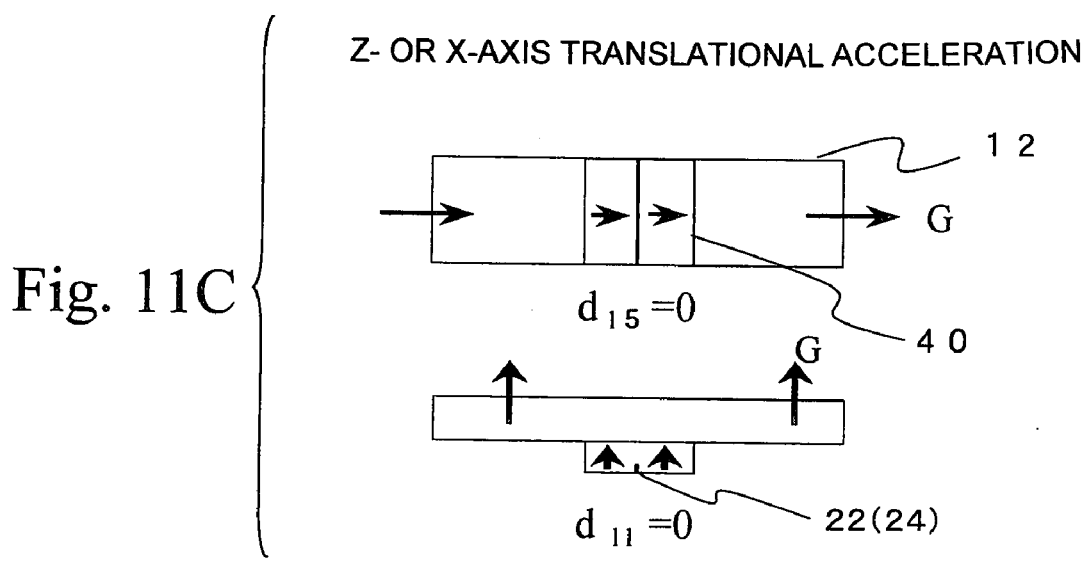

When a translational acceleration in the X-axis or Z-axis direction is applied, the constant d15 that is perpendicular to the polarization axis and the constant d11 in the thickness direction are both zero, and potentials are not generated in the vibrator 40, as shown in FIG. 11C.

The acceleration sensor described above is to be connected to the detection circuits shown in FIGS. 7A, 7B, and 7C.

Next, acceleration detection performed in the case where the center point of the acceleration sensor of the second embodiment is located at the center of rotation is described. FIG. 12A shows the relationship between detectable accelerations in this situation and each of the circuits A, B, and C. In the case where the circuit A shown in FIG. 7A is employed, the in-plane angular acceleration (about the X axis) can be detected, as the two potentials are in the opposite phases with respect to the in-plane angular acceleration. With respect to the translational acceleration in the Y-axis direction, the two potentials have the same amplitude values and are in the same phase. Accordingly, the potentials are canceled by differential detection and become zero. As for the translational acceleration in the X-axis or Z-axis direction, the constants d are zero. In the case where the circuit B is employed, the two electric charges (or potentials) have the same amplitude values and are in the opposite phases with respect to the in-plane angular acceleration (about the X axis). Accordingly, the potentials are canceled by addition detection and become zero. With respect to the translational acceleration in the Y-axis direction, the two potentials have the same amplitude values and are in the same phase. Accordingly, the translational acceleration in the Y-axis direction can be detected by addition detection. As for the translational acceleration in the X-axis or Z-axis direction, the constants d are zero. With the circuit C, both the in-plane angular acceleration (about the X axis) and the translational acceleration in the Y-axis direction can be detected separately from each other. As described so far, when the center point of the acceleration sensor is located at the center of rotation, only the in-plane angular acceleration is detected with the circuit A, only the translational acceleration in the Y-axis direction is detected with the circuit B, and the angular acceleration (about the X axis) and the translational acceleration in the Y-axis direction are detected at the same time but separately from each other with the circuit C.

Next, acceleration detection performed in the case where the center point of the acceleration sensor of the second embodiment is located in a different position from the center of rotation is described. FIG. 12B shows the relationship between detectable accelerations in this situation and each of the circuits A, B, and C. In the case where the circuit A is employed, the in-plane angular acceleration (about the X axis) can be detected, as the two potentials exhibit different amplitude values and are in the same phase with respect to the in-plane angular acceleration. With respect to the translational acceleration in the Y-axis direction, the two potentials have the same amplitude values and are in the same phase. Accordingly, the potentials are canceled by differential detection and become zero. As for the translational acceleration in the X-axis or Z-axis direction, the constants d are zero. In the case where the circuit B is employed, the in-plane angular acceleration (about the X axis) can be detected by addition detection, as the two potentials have different amplitude values and are in the same phase with respect to the in-plane angular acceleration. The translational acceleration in the Y-axis direction can also be detected by addition detection, as the two potentials have the same amplitude values and are in the same phase with respect to the translational acceleration in the Y-axis direction. As for the translational acceleration in the X-axis or Z-axis direction, the constants d are zero. With the circuit C, the in-plane angular acceleration (about the X axis) and the translational acceleration in the Y-axis direction can be detected at the same time. As described so far, when the center point of the acceleration sensor is located in a different position from the center of rotation, only the in-plane angular acceleration is detected with the circuit A, and the in-plane angular acceleration and the translational acceleration in the Y-axis direction are detected at the same time with the circuit B or C.

As described so far, the acceleration sensor of the second embodiment can simultaneously detect angular acceleration and translational acceleration separately from each other.

The cut angle θ is not strictly required to be 90 degrees, and may include an error that is caused during the production process of the acceleration sensor. Furthermore, the cut angle θ may take any value in the neighborhood of 90°, as long as the effects shown in FIGS. 12A and 12B can be achieved, and the predetermined accuracy can be maintained in the acceleration detection.

THIRD EMBODIMENT

Figure 13A:
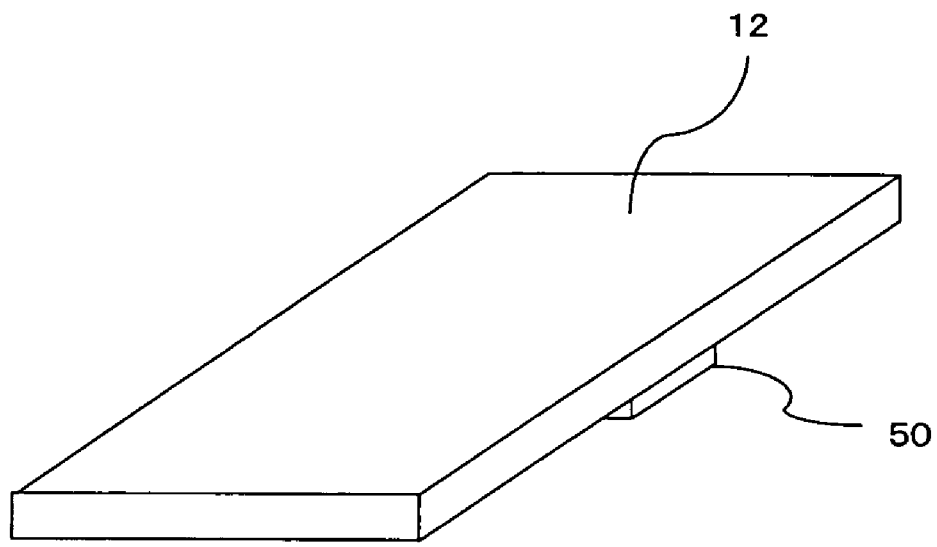
FIG. 13A is a perspective view of an acceleration sensor in accordance with a third embodiment of the present invention.
Figure 13B:
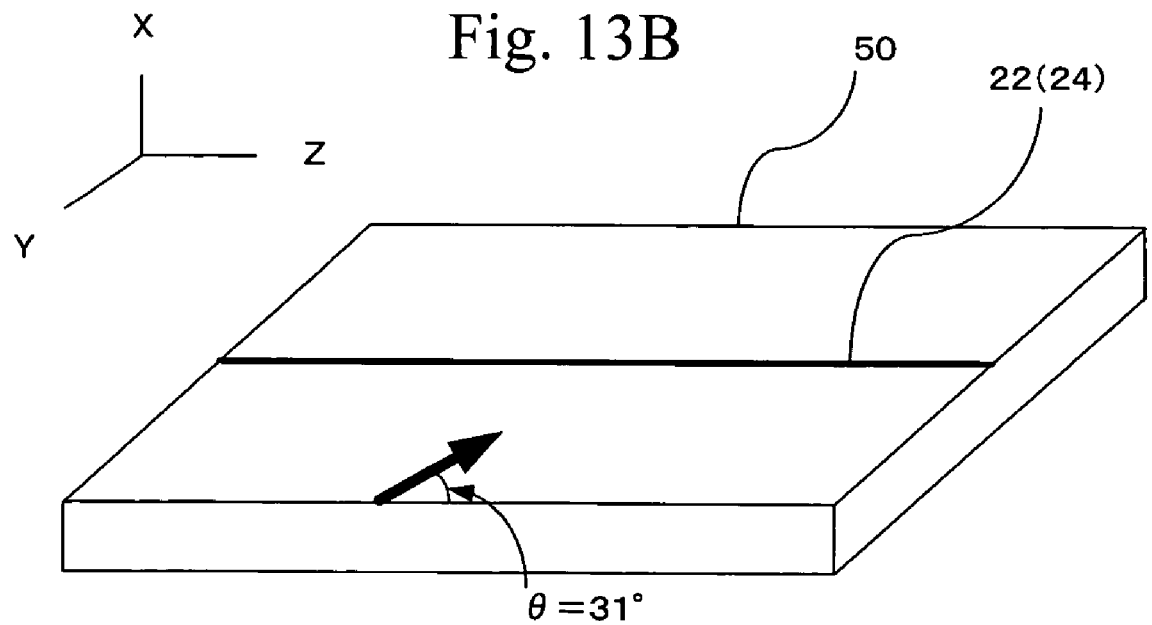
FIG. 13B is a perspective view of the vibrator of the acceleration sensor in accordance with the third embodiment.

FIGS. 13A and 13B illustrate an acceleration sensor in accordance with a third embodiment of the present invention. In FIGS. 13A and 13B, the same components as those described above are denoted by the same reference numerals as above. The X axis, the Y axis, and the Z axis are the same as those shown in FIG. 1A. A vibrator 50 of the third embodiment is made of a piezoelectric single-crystal material. The polarization axis of the vibrator 50 is set at 31° (θ=31°; θ=0° representing the Z-axis direction). When the cut angle θ is 31°, the constant d16 is zero, and d16/d15 is also zero. The vibrator 50 is located at the center of gravity of the weight 12, and is divided into two as shown in FIG. 13B.

Figure 14:
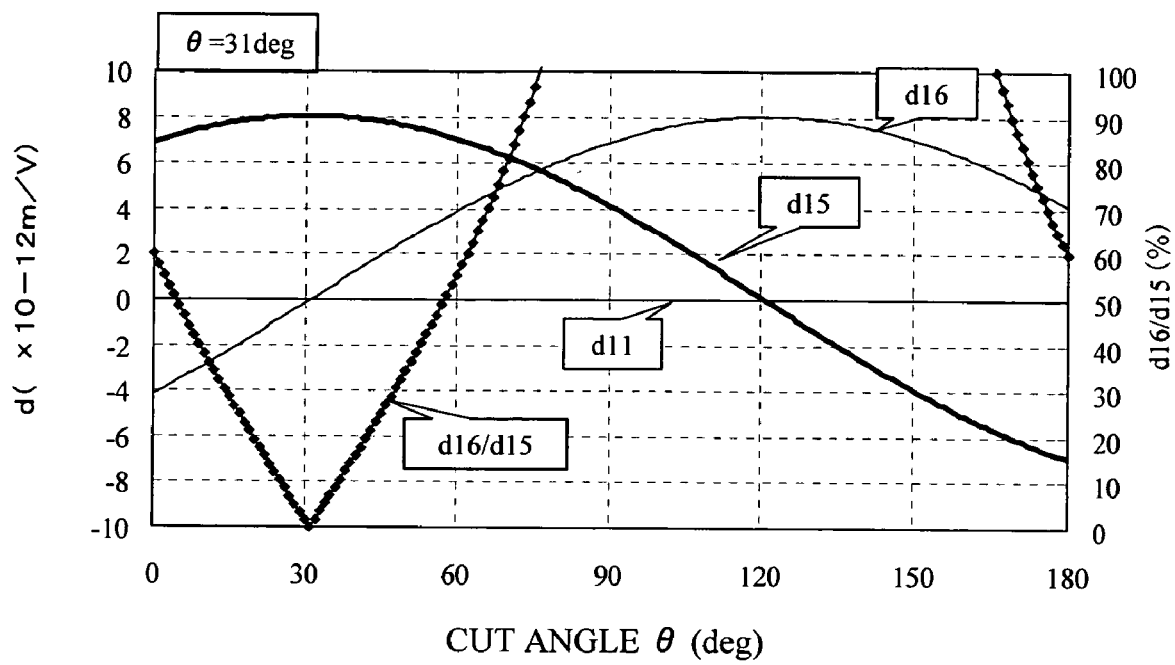
FIG. 14 shows examples of the constants of the piezoelectric single-crystal material used in the third embodiment of the present invention.

FIG. 14 shows examples of the piezoelectric constants with lithium niobate ($LiNbO_3$; hereinafter referred to simply as LN). By placing the vibrator 50 with the two-section structure at the center of gravity of the weight 12, and setting the polarization axis at 31 degrees (θ=31°) or in the neighborhood of 31 degrees, an acceleration sensor that detects both angular acceleration (rotational acceleration) and translational acceleration can be realized. In the following, the principles of the acceleration detection are described.

Figure 15A:
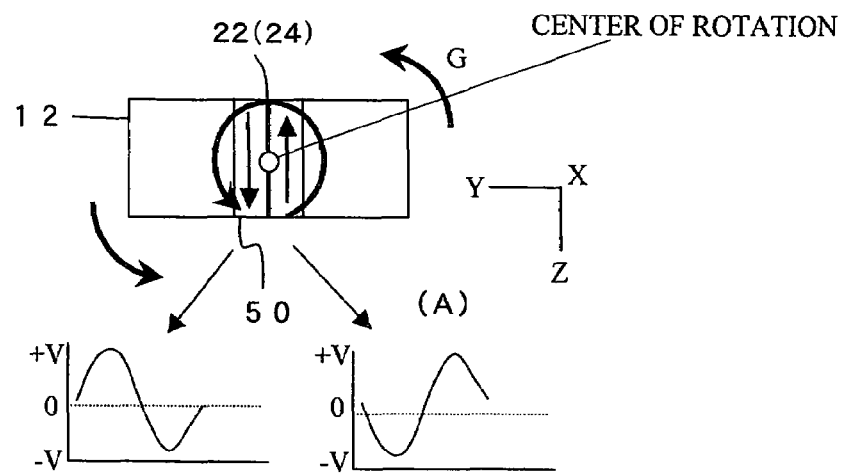
FIGS. 15A and 15B illustrate the principles of acceleration detection in accordance with the third embodiment of the present invention.

When an in-plane rotational vibration is applied to the acceleration sensor, and the center point of the acceleration sensor is located at the center of rotation, potentials that have the same amplitude values and are in the opposite phases are generated in the vibrator 50, as shown in FIG. 15A.

Figure 15B:
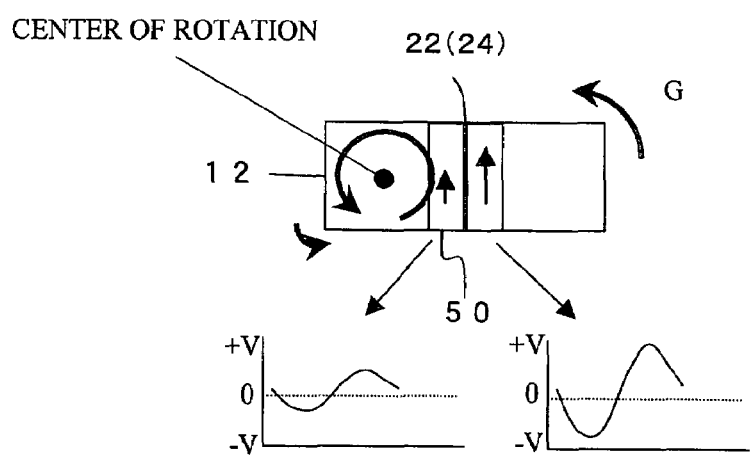

When an in-plane rotational vibration is applied to the acceleration sensor, and the center point of the acceleration sensor is located in a different position from the center of rotation, potentials that have different amplitude values and are in the same phase are generated in the vibrator 50, as shown in FIG. 15B.

Figure 16A:
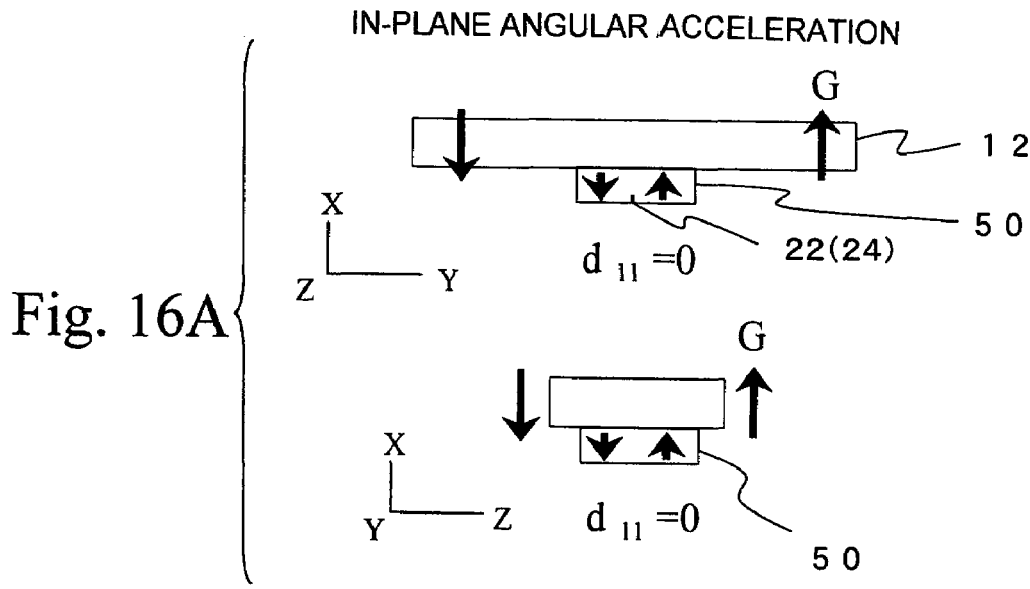
FIGS. 16A through 16C also illustrate the principles of acceleration detection in accordance with the third embodiment of the present invention.

When a rotational vibration in the direction perpendicular to the plane is applied to the acceleration sensor, the piezoelectric constant d11 in the thickness direction is zero, and potentials are not generated in the vibrator 50, as shown in FIG. 16A.

Figure 16B:
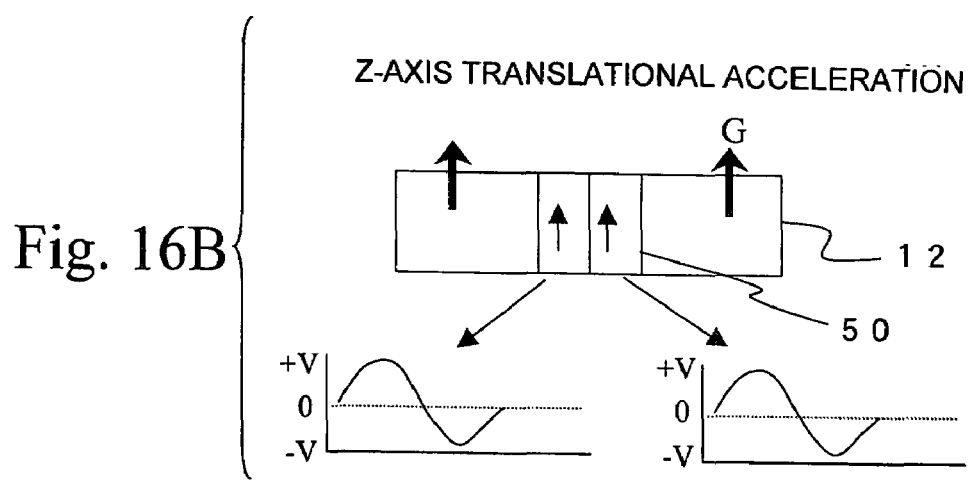

When a translational acceleration in the Z-axis direction is applied, potentials that have the same amplitude values and are in the same phase are generated in the vibrator 50, as shown in FIG. 16B.

Figure 16C:
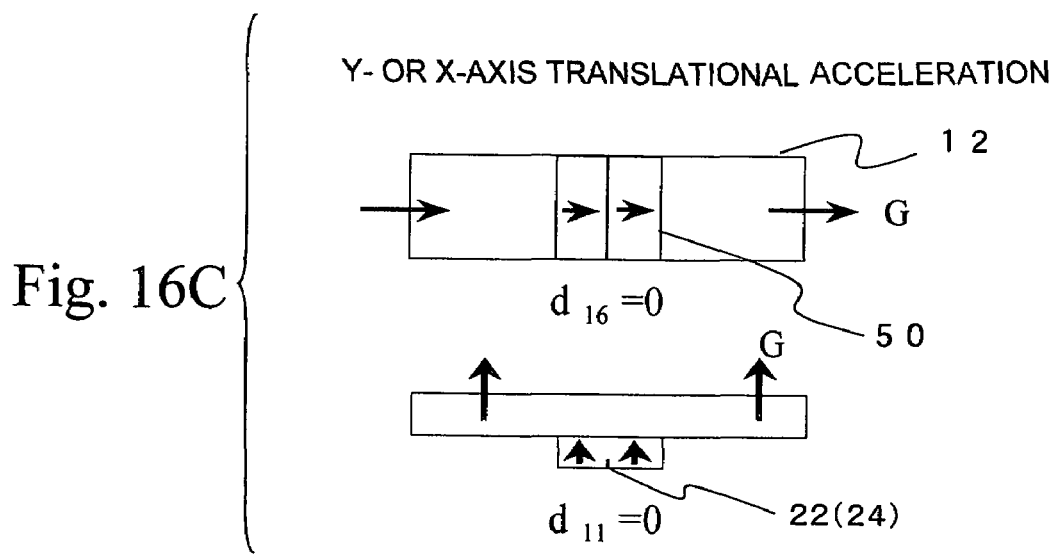

When a translational acceleration in the X-axis or Y-axis direction is applied, the constant d16 that is perpendicular to the polarization axis and the constant d11 in the thickness direction are both zero, and potentials are not generated in the vibrator 50, as shown in FIG. 16C.

The acceleration sensor described above is to be connected to the detection circuits shown in FIGS. 7A, 7B, and 7C.

Next, acceleration detection performed in the case where the center point of the acceleration sensor of the third embodiment is located at the center of rotation is described. FIG. 17A shows the relationship between the detectable accelerations in this situation and the circuits A, B, and C. In the case where the circuit A shown in FIG. 7A is employed, the in-plane angular acceleration (about the X axis) can be detected, as the two potentials are in the opposite phases with respect to the in-plane angular acceleration. With respect to the translational acceleration in the Z-axis direction, the two potentials have the same amplitude values and are in the same phase. Accordingly, the potentials are canceled by differential detection and become zero. As for the translational acceleration in the X-axis or Y-axis direction, the constants d are zero. In the case where the circuit B is employed, the two electric charges (or potentials) have the same amplitude values and are in the opposite phases with respect to the in-plane angular acceleration (about the X axis). Accordingly, the potentials are canceled by addition detection and become zero. With respect to the translational acceleration in the Z-axis direction, the two potentials have the same amplitude values and are in the same phase. Accordingly, the translational acceleration in the Z-axis direction can be detected by addition detection. As for the translational acceleration in the X-axis or Y-axis direction, the constants d are zero. With the circuit C, both the in-plane angular acceleration (about the X axis) and the translational acceleration in the Z-axis direction can be detected separately from each other. As described so far, when the center point of the acceleration sensor is located at the center of rotation, only the in-plane angular acceleration is detected with the circuit A, only the translational acceleration in the Z-axis direction is detected with the circuit B, and the angular acceleration (about the X axis) and the translational acceleration in the Z-axis direction are detected at the same time but separately from each other with the circuit C.

Next, acceleration detection performed in the case where the center point of the acceleration sensor of the third embodiment is located in a different position from the center of rotation is described. FIG. 17B shows the relationship between the detectable accelerations in this situation and the circuits A, B, and C. In the case where the circuit A is employed, the in-plane angular acceleration (about the X axis) can be detected, as the two potentials exhibit different amplitude values and are in the same phase with respect to the in-plane angular acceleration. With respect to the translational acceleration in the Z-axis direction, the two potentials have the same amplitude values and are in the same phase. Accordingly, the potentials are canceled by differential detection and become zero. As for the translational acceleration in the X-axis or Y-axis direction, the constants d are zero. In the case where the circuit B is employed, the in-plane angular acceleration (about the X axis) can be detected by addition detection, as the two potentials have different amplitude values and are in the same phase with respect to the in-plane angular acceleration. The translational acceleration in the Z-axis direction can also be detected by addition detection, as the two potentials have the same amplitude values and are in the same phase with respect to the translational acceleration in the Z-axis direction. As for the translational acceleration in the X-axis or Y-axis direction, the constants d are zero. With the circuit C, the in-plane angular acceleration (about the X axis) and the translational acceleration in the Z-axis direction can be detected at the same time. As described so far, when the center point of the acceleration sensor is located in a different position from the center of rotation, only the in-plane angular acceleration is detected with the circuit A, and the in-plane angular acceleration and the translational acceleration in the Z-axis direction are detected at the same time with the circuit B or C.

The vibrator 50 may be formed of a piezoelectric single-crystal material other than LN, such as $KNbO_3$ or $LiTaO_3$.

As described so far, the acceleration sensor of the third embodiment can simultaneously detect angular acceleration and translational acceleration separately from each other.

The cut angle θ is not strictly required to be 31°, and may include an error that is caused during the production process of the acceleration sensor. Furthermore, the cut angle θ may take any value in the neighborhood of 31°, as long as the effects shown in FIGS. 17A and 17B can be achieved, and the predetermined accuracy can be maintained in the acceleration detection.

FOURTH EMBODIMENT

Figure 18A:
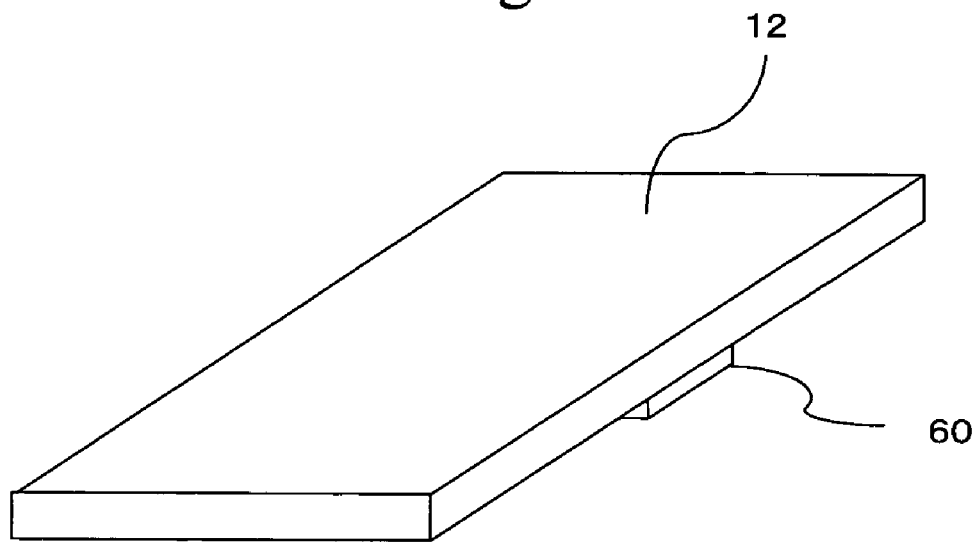
FIG. 18A is a perspective view of an acceleration sensor in accordance with a fourth embodiment of the present invention.
Figure 18B:
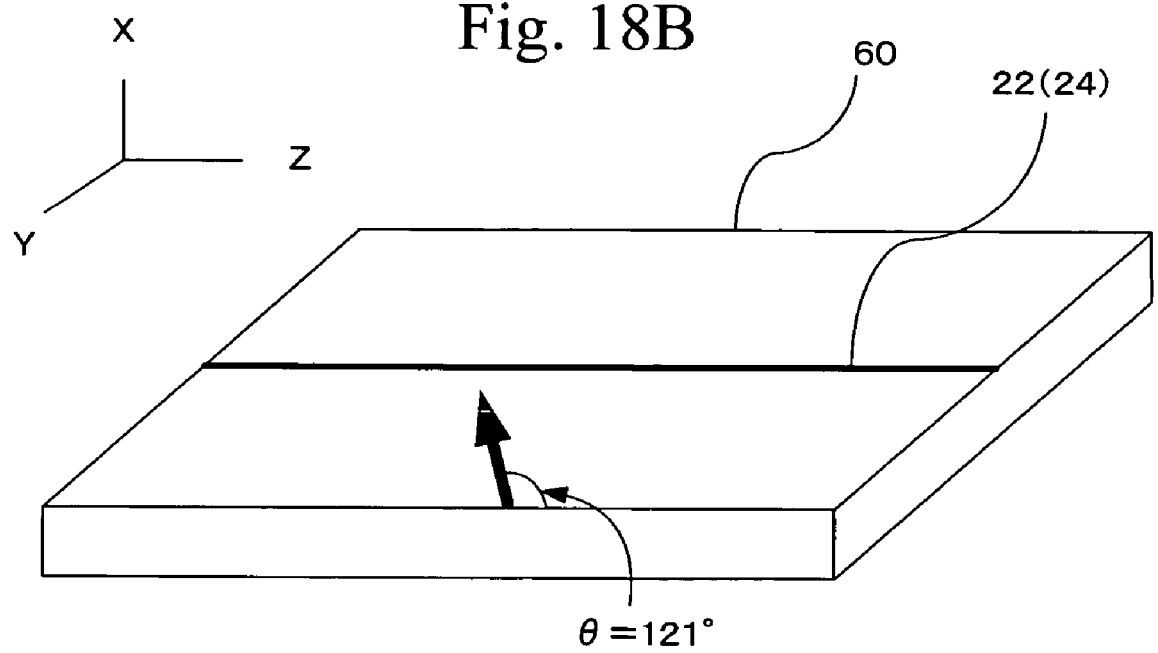
FIG. 18B is a perspective view of the vibrator of the acceleration sensor in accordance with the fourth embodiment.

FIGS. 18A and 18B illustrate an acceleration sensor in accordance with a fourth embodiment of the present invention. In FIGS. 18A and 18B, the same components as those described above are denoted by the same reference numerals as the above. The X axis, the Y axis, and the Z axis are the same as those shown in FIG. 1A. A vibrator 60 of the fourth embodiment is made of a piezoelectric single-crystal material. The polarization axis of the vibrator 60 is set at 121° (θ=121°; θ=0° representing the Z-axis direction) or in the neighborhood of 121°. When the cut angle θ is 121°, the constant d15 is zero. The vibrator 60 is located at the center of gravity of the weight 12, and is divided into two as shown in FIG. 18B.

Figure 19:
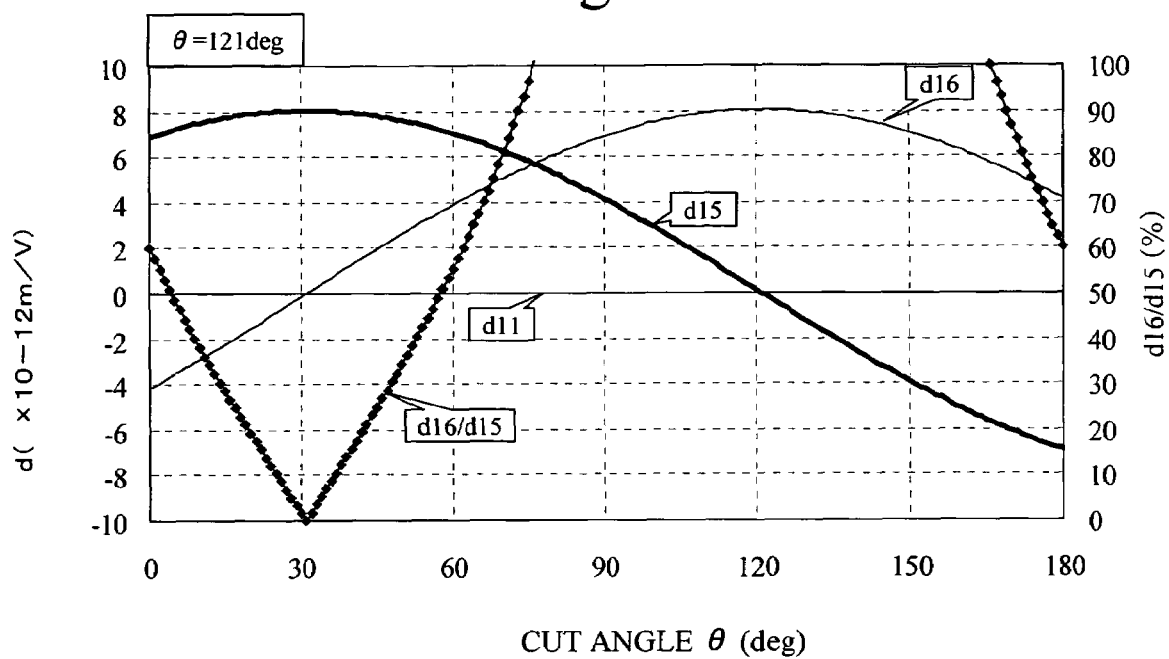
FIG. 19 shows examples of the constants of the piezoelectric single-crystal material used in the fourth embodiment of the present invention.

FIG. 19 shows examples of the piezoelectric constants of $LiNbO_3$ (LN) (the graph is the same as the graph of FIG. 14). By placing the vibrator 60 with the two-section structure at the center of gravity of the weight 12, and setting the polarization axis at 121°(θ=121°) or in the neighborhood of 121°, an acceleration sensor that detects both angular acceleration (rotational acceleration) and translational acceleration can be realized. In the following, the principles of the acceleration detection are described.

Figure 20A:
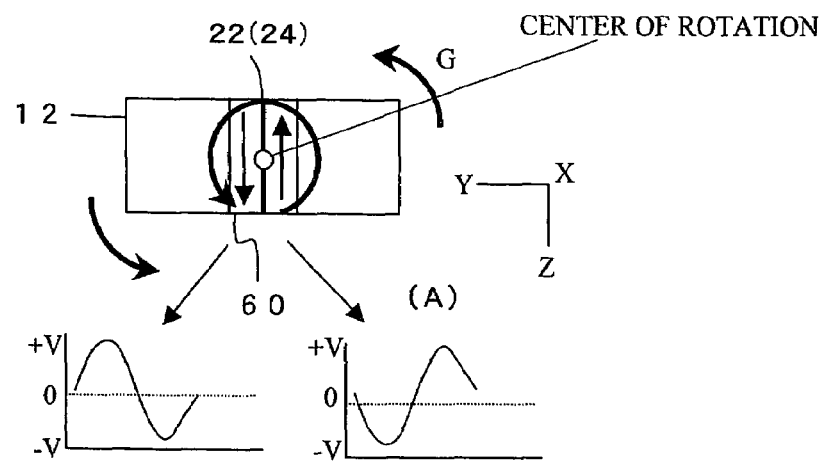
FIGS. 20A and 20B illustrate the principles of acceleration detection in accordance with the fourth embodiment of the present invention.

When an in-plane rotational vibration is applied to the acceleration sensor, and the center point of the acceleration sensor is located at the center of rotation, potentials that have the same amplitude values and are in the opposite phases are generated in the vibrator 60, as shown in FIG. 20A.

Figure 20B:
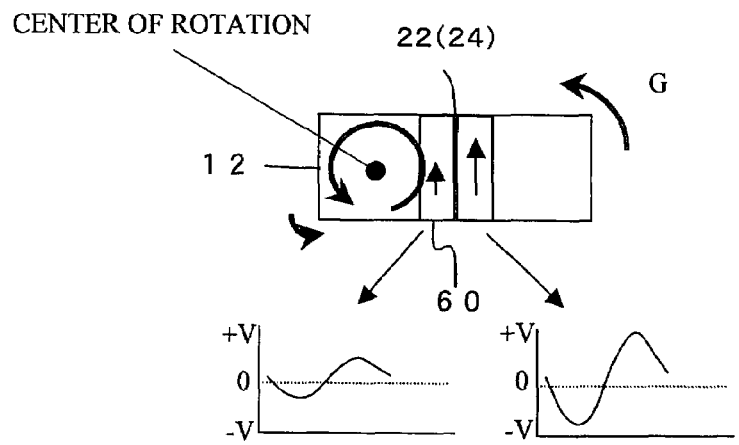

When an in-plane rotational vibration is applied to the acceleration sensor, and the center point of the acceleration sensor is located in a different position from the center of rotation, potentials that have different amplitude values and are in the same phase are generated in the vibrator 60, as shown in FIG. 20B.

Figure 21A:
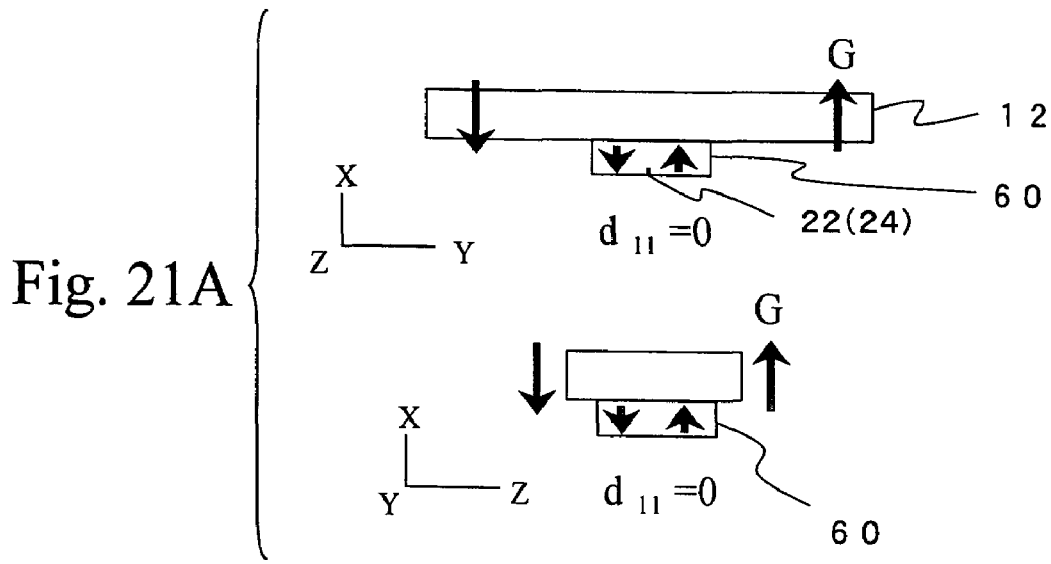
FIGS. 21A through 21C also illustrate the principles of acceleration detection in accordance with the fourth embodiment of the present invention.

When a rotational vibration in the direction perpendicular to the plane is applied to the acceleration sensor, the piezoelectric constant d11 in the thickness direction is zero, and potentials are not generated in the vibrator 60, as shown in FIG. 21A.

Figure 21B:
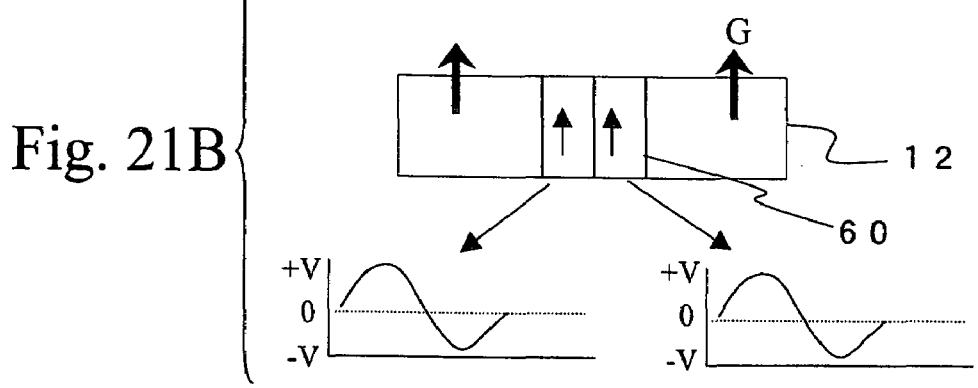

When a translational acceleration in the Y-axis direction is applied, potentials that have the same amplitude values and are in the same phase are generated in the vibrator 60, as shown in FIG. 21B.

Figure 21C:
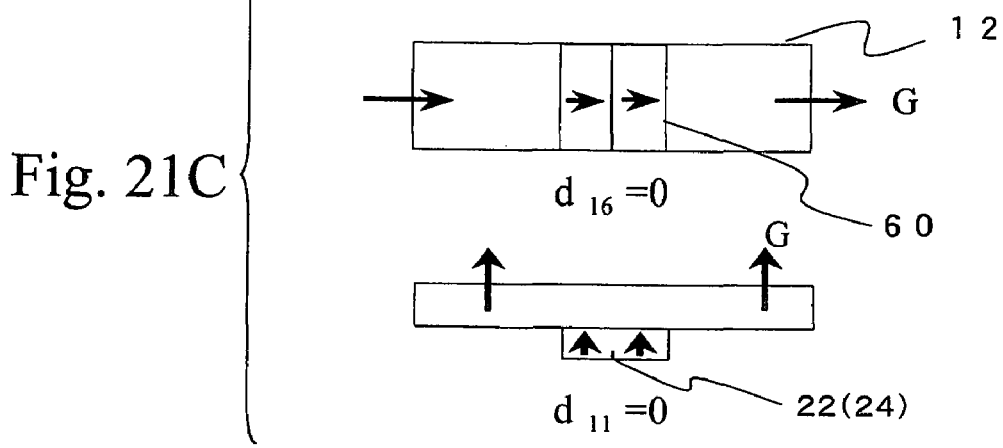

When a translational acceleration in the X-axis or Z-axis direction is applied, the constant d15 that is perpendicular to the polarization axis and the constant d11 in the thickness direction are both zero, and potentials are not generated in the vibrator 60, as shown in FIG. 21C.

The acceleration sensor described above is to be connected to the detection circuits shown in FIGS. 7A, 7B, and 7C.

Next, acceleration detection performed in the case where the center point of the acceleration sensor of the fourth embodiment is located at the center of rotation is described. FIG. 22A shows the relationship between the detectable accelerations in this situation and each of the circuits A, B, and C. In the case where the circuit A is employed, the in-plane angular acceleration (about the X axis) can be detected, as the two potentials are in the opposite phases with respect to the in-plane angular acceleration. With respect to the translational acceleration in the Y-axis direction, the two potentials have the same amplitude values and are in the same phase. Accordingly, the potentials are canceled by differential detection and become zero. As for the translational acceleration in the X-axis or Z-axis direction, the constants d are zero. In the case where the circuit B is employed, the two electric charges (or potentials) have the same amplitude values and are in the opposite phases with respect to the in-plane angular acceleration (about the X axis). Accordingly, the potentials are canceled by addition detection and become zero. With respect to the translational acceleration in the Y-axis direction, the two potentials have the same amplitude values and are in the same phase. Accordingly, the translational acceleration in the Y-axis direction can be detected by addition detection. As for the translational acceleration in the X-axis or Z-axis direction, the constants d are zero. With the circuit C, both the in-plane angular acceleration (about the X axis) and the translational acceleration in the Y-axis direction can be detected separately from each other. As described so far, when the center point of the acceleration sensor is located at the center of rotation, only the in-plane angular acceleration is detected with the circuit A, only the translational acceleration in the Y-axis direction is detected with the circuit B, and the angular acceleration (about the X axis) and the translational acceleration in the Y-axis direction are detected at the same time or separately from each other with the circuit C.

Next, acceleration detection performed in the case where the center point of the acceleration sensor of the fourth embodiment is located in a different position from the center of rotation is described. FIG. 22B shows the relationship between the detectable accelerations in this situation and each of the circuits A, B, and C. In the case where the circuit A is employed, the in-plane angular acceleration (about the X axis) can be detected, as the two potentials exhibit different amplitude values and are in the same phase with respect to the in-plane angular acceleration. With respect to the translational acceleration in the Y-axis direction, the two potentials have the same amplitude values and are in the same phase. Accordingly, the potentials are canceled by differential detection and become zero. As for the translational acceleration in the X-axis or Z-axis direction, the constants d are zero. In the case where the circuit B is employed, the in-plane angular acceleration (about the X axis) can be detected by addition detection, as the two potentials have different amplitude values and are in the same phase with respect to the in-plane angular acceleration. The translational acceleration in the Y-axis direction can also be detected by addition detection, as the two potentials have the same amplitude values and are in the same phase with respect to the translational acceleration in the Y-axis direction. As for the translational acceleration in the X-axis or Z-axis direction, the constants d are zero. With the circuit C, the in-plane angular acceleration (about the X axis) and the translational acceleration in the Y-axis direction can be detected at the same time. As described so far, when the center point of the acceleration sensor is located in a different position from the center of rotation, only the in-plane angular acceleration is detected with the circuit A, and the in-plane angular acceleration and the translational acceleration in the Y-axis direction are detected at the same time with the circuit B or C.

The vibrator 60 may be formed of a piezoelectric single-crystal material other than LN, such as $KNbO_3$ or $LiTaO_3$.

As described so far, the acceleration sensor of the fourth embodiment can simultaneously detect angular acceleration and translational acceleration separately from each other.

The cut angle θ is not strictly required to be 121°, and may include an error that is caused during the production process of the acceleration sensor. Furthermore, the cut angle θ may take any value in the neighborhood of 121°, as long as the effects shown in FIGS. 22A and 22B can be achieved, and the predetermined accuracy can be maintained in the acceleration detection.

FIFTH EMBODIMENT

Figure 23A:
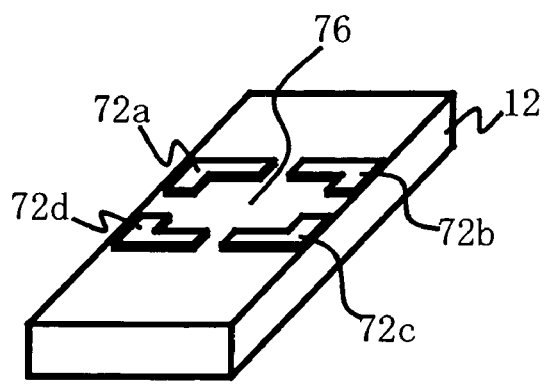
FIGS. 23A and 23B are perspective views each illustrating an example structure of a weight that is equipped with a positioning mechanism employed in a fifth embodiment of the present invention.
Figure 23B:
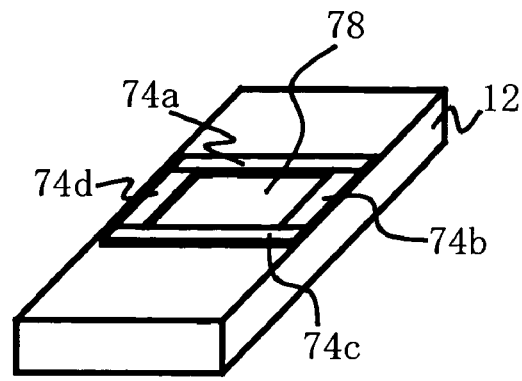
Figure 24A:
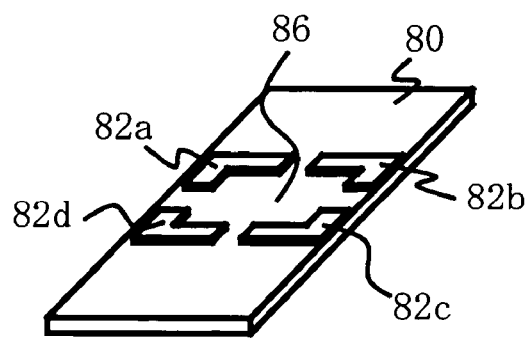
FIGS. 24A and 24B are perspective views each illustrating an example structure of a substrate that is equipped with a positioning mechanism employed in the fifth embodiment of the present invention.
Figure 24B:
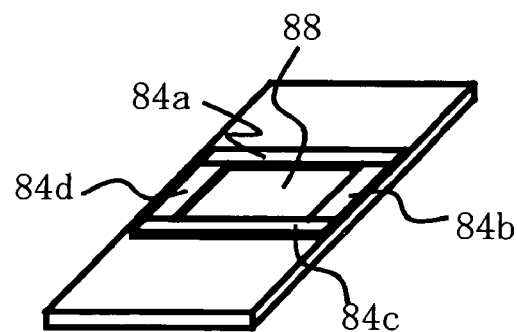

FIGS. 23A and 23B and FIGS. 24A and 24B illustrate a fifth embodiment of the present invention. FIGS. 23A and 23B each shows a positioning mechanism for mounting the vibrator 10 onto the weight 12. FIGS. 24A and 24B each shows a positioning mechanism for mounting the vibrator 10 onto a substrate to which an acceleration sensor is to be attached.

The positioning mechanism shown in FIG. 23A has four L-shaped blocks 72a, 72b, 72c, and 72d formed on the weight 12. These blocks form a space 76 to accommodate the vibrator 10. The length and width of the space 76 are equal to or slightly greater than the length and width of the vibrator 10. The positioning mechanism shown in FIG. 23B has four rectangular-parallelepiped blocks 74a, 74b, 74c, and 74d formed on the weight 12. These blocks form a space 78 to accommodate the vibrator 10. The length and width of the space 78 are equal to or slightly greater than the length and width of the vibrator 10. With the simple mounting technique using one of the above positioning mechanisms, variation in sensitivity can be reduced.

The positioning mechanism shown in FIG. 24A has four L-shaped blocks 82a, 82b, 82c, and 82d formed on a substrate 80. These blocks form a space 86 to accommodate the vibrator 10. The length and width of the space 86 are equal to or slightly greater than the length and width of the vibrator 10. The positioning mechanism shown in FIG. 24B has four rectangular-parallelepiped blocks 84a, 84b, 84c, and 84d formed on the substrate 80. These blocks form a space 88 to accommodate the vibrator 10. The length and width of the space 88 are equal to or slightly greater than the length and width of the vibrator 10. With the simple mounting technique using one of the above positioning mechanisms, variation in sensitivity can be reduced. The structure in which the vibrator 10 supporting the weight 12 is attached to the substrate 80 constitutes an acceleration sensor as one embodiment of the present invention.

Although not shown in the drawings, it is possible to form an extraction electrode pattern for the detection electrodes 14 and 16 or the ground electrode 20 on the substrate 80. Likewise, it is possible to form an extraction electrode pattern on the weight 12. Also, any other vibrator than the vibrator 10 can be easily positioned by any of the above described positioning mechanisms.

Each of the above described embodiments of the present invention provides an acceleration sensor that can detect both angular acceleration and translational acceleration by a simple detecting method that depends on the structure of the vibrator and the mounting position of the weight.

As described so far, the present invention provides an acceleration sensor with a simple structure that can easily detect different types of acceleration such as angular acceleration and translational acceleration.

The invention claimed is:
1. An acceleration sensor comprising:
a weight;
a vibrator for supporting the weight at the center of gravity thereof, wherein the vibrator has such a cut angle that the piezoelectric constant in the longitudinal direction of the weight is zero and the piezoelectric constant in the thickness direction of the weight is also zero and for detecting an in-plane acceleration, the vibrator being positioned in a center of the weight in a longitudinal direction of the weight such that a center of rotation being located at a position further out than the vibrator in the longitudinal direction;
a first circuit that adds up outputs generated from two regions formed by dividing a surface of the vibrator into two in the longitudinal direction of the weight and provides output detection signals corresponding to translational acceleration; and
a second circuit that outputs the difference between the outputs and provides output detection signals correspond to angular acceleration, and
wherein the weight having a size greater than that of the vibrator in the longitudinal direction, and
wherein a sense signal based on the in-plane angular acceleration being output across detection electrodes provided on the vibrator.

2. The acceleration sensor as claimed in claim 1, further comprising two detection electrodes that are placed on a surface of the vibrator and are arranged to divide the surface into two.

3. The acceleration sensor as claimed in claim 1, further comprising two detection electrodes that are placed on a surface of the vibrator and are arranged to divide the surface into two in the longitudinal direction of the weight.

4. The acceleration sensor as claimed in claim 1, further comprising two detection electrodes that are placed on a surface of the vibrator and are arranged to divide the surface into two in the longitudinal direction of the weight, wherein the vibrator has a groove formed between the two detection electrodes.

5. The acceleration sensor as claimed in any of claims 1 through 4, wherein the vibrator has a polarization axis that extends in a direction perpendicular to the longitudinal direction of the weight.

6. The acceleration sensor as claimed in any of claims 1 through 4, wherein the vibrator has a polarization axis in a direction perpendicular to the longitudinal direction of the weight.

7. The acceleration sensor as claimed in claim 1, wherein the vibrator is made of a piezoelectric ceramics material.

8. The acceleration sensor as claimed in claim 1, wherein: the vibrator is made of a piezoelectric single-crystal material.

9. The acceleration sensor as claimed in any of claims 1 through 4, further comprising a positioning mechanism that is attached to the weight, wherein the positioning mechanism has positioning pieces that form a space to accommodate the vibrator.

10. The acceleration sensor as claimed in any of claims 1 through 4, further comprising a substrate that supports the vibrator.

11. The acceleration sensor as claimed in any of claims 1 through 4, wherein the vibrator is a shear vibrator.

12. An acceleration sensor comprising:
a weight;
a vibrator for supporting the weight at a center of gravity thereof, wherein the vibrator has such a cut angle that a piezoelectric constant in the longitudinal direction of the weight is zero and a piezoelectric constant in the thickness direction of the weight is also zero, and for detecting an in-plane acceleration, the vibrator being positioned in a center of the weight in a longitudinal direction of the weight such that a center of rotation being located at a position further out than the vibrator in the longitudinal direction, and
a circuit that outputs detection signals corresponding to angular acceleration and translational acceleration, the detection signals being obtained by processing outputs generated from two regions formed by dividing a surface of the vibrator into two in the longitudinal direction of the weight, and
wherein the weight has a size greater than that of the vibrator in the longitudinal direction,
wherein a sense signal based on the in-plane angular acceleration is output across detection electrodes provided on the vibrator.

* * * * *